US012512602B2

(12) United States Patent
Fonseca

(10) Patent No.: US 12,512,602 B2
(45) Date of Patent: Dec. 30, 2025

(54) WAVEGUIDE FEED ARRAY WITH OVERLAPPING CLUSTERS FOR USE IN A TRANSMIT/RECEIVE MULTIPLE-FEED-PER-BEAM SINGLE REFLECTOR ANTENNA SYSTEM

(71) Applicant: European Space Agency, Paris (FR)

(72) Inventor: Nelson Fonseca, Noordwijk (NL)

(73) Assignee: European Space Agency, Paris (FR)

( * ) Notice: Subject to any disclaimer, the term of this patent is extended or adjusted under 35 U.S.C. 154(b) by 43 days.

(21) Appl. No.: 18/834,388

(22) PCT Filed: Jan. 31, 2022

(86) PCT No.: PCT/EP2022/052186
§ 371 (c)(1),
(2) Date: Jul. 30, 2024

(87) PCT Pub. No.: WO2023/143742
PCT Pub. Date: Aug. 3, 2023

(65) Prior Publication Data
US 2025/0174911 A1 May 29, 2025

(51) Int. Cl.
*H01Q 21/06* (2006.01)
*H01Q 5/307* (2015.01)
(Continued)

(52) U.S. Cl.
CPC ........... *H01Q 21/064* (2013.01); *H01Q 5/307* (2015.01); *H01Q 15/16* (2013.01); *H01Q 19/10* (2013.01);
(Continued)

(58) Field of Classification Search
CPC ..... H01Q 5/30–307; H01Q 13/00–065; H01Q 15/16; H01Q 19/10; H01Q 19/17;
(Continued)

(56) References Cited

U.S. PATENT DOCUMENTS 6,307,502 B1 * 10/2001 Marti-Canales ..... H01Q 21/064 374/E11.003
7,834,803 B2 * 11/2010 Weinstein .............. H01Q 21/24 342/149
9,306,293 B2 * 4/2016 Bosshard ........... H04B 7/18515
9,306,295 B2 * 4/2016 Bosshard ............... H01Q 21/29
(Continued)

FOREIGN PATENT DOCUMENTS

CN 114883797 A * 8/2022 ............. H01Q 21/24

OTHER PUBLICATIONS

International Search Report for International Application No. PCT/EP2022/052186 dated Sep. 20, 2022, 3 pages.

*Primary Examiner* — Ab Salam Alkassim, Jr.
(74) *Attorney, Agent, or Firm* — Seed Intellectual Property Law Group LLP

(57) ABSTRACT

A waveguide feed array includes overlapping clusters of elementary feeds, each feed configured to operate in at least two distinct frequency bands with dual-polarization in each frequency band. The feeds have at least four waveguide ports each, one for each pairing of frequency band and polarization, and are connected through beamforming networks, one per frequency band. Clusters of feeds each have at least two beamforming networks and at least two common ports. The waveguide feed array further has a main longitudinal direction that is substantially orthogonal to a plane of an aperture of the waveguide feed array, the plane being defined by two main directions. Adjacent clusters along a first of the main directions are configured to operate, for a given frequency band, in different polarizations. At least one feed of each cluster is rotated around the main longitudinal direction with reference to the other feeds of said cluster.

19 Claims, 20 Drawing Sheets

(51) Int. Cl.

| | |
|---|---|
| ***H01Q 15/16*** | (2006.01) |
| ***H01Q 19/10*** | (2006.01) |
| ***H01Q 21/00*** | (2006.01) |
| ***H01Q 21/22*** | (2006.01) |
| ***H01Q 21/24*** | (2006.01) |
| ***H01Q 25/00*** | (2006.01) |
| *H01Q 1/28* | (2006.01) |

(52) U.S. Cl.
CPC ......... *H01Q 21/0006* (2013.01); *H01Q 21/22* (2013.01); *H01Q 21/24* (2013.01); *H01Q 25/007* (2013.01); *H01Q 1/288* (2013.01)

(58) Field of Classification Search
CPC ...... H01Q 21/064; H01Q 21/24; H01Q 21/22; H01Q 21/0006; H01Q 1/288; H01Q 25/007
See application file for complete search history.

(56) References Cited

U.S. PATENT DOCUMENTS

| | | | | |
|---|---|---|---|---|
| 10,135,144 | B2 * | 11/2018 | Bosshard | H01Q 1/288 |
| 2005/0104794 | A1 * | 5/2005 | Rao | H01Q 13/0258 343/781 R |
| 2010/0052987 | A1 * | 3/2010 | Weinstein | H01Q 21/24 342/372 |
| 2014/0022138 | A1 * | 1/2014 | Bosshard | H01Q 21/064 343/835 |
| 2017/0170561 | A1 * | 6/2017 | Simon | H01Q 21/064 |
| 2019/0267716 | A1 * | 8/2019 | Yoon | H01Q 13/0233 |
| 2019/0288405 | A1 * | 9/2019 | Tomura | H01P 1/2131 |
| 2020/0006863 | A1 * | 1/2020 | Fleancu | H01Q 25/001 |
| 2020/0006865 | A1 * | 1/2020 | Adada | H01Q 3/30 |
| 2020/0036088 | A1 | 1/2020 | Bongard et al. | |
| 2021/0320415 | A1 * | 10/2021 | Calzuola | H01Q 13/0258 |
| 2021/0336347 | A1 * | 10/2021 | Yoon | H01Q 1/2283 |
| 2022/0368026 | A1 * | 11/2022 | Hollenbeck | H01Q 21/0037 |

* cited by examiner

WAVEGUIDE FEED ARRAY WITH OVERLAPPING CLUSTERS FOR USE IN A TRANSMIT/RECEIVE MULTIPLE-FEED-PER-BEAM SINGLE REFLECTOR ANTENNA SYSTEM

BACKGROUND

Technical Field

This application relates to a waveguide feed array for use in combination with a reflector antenna and a communication satellite comprising such an antenna system. In particular, the application relates to a waveguide feed array comprising overlapping clusters operating simultaneously in the transmit and receive frequency bands, enabling full-duplex communication, and producing a coverage of multiple contiguous beams, congruent in transmit and receive, using a single reflector antenna system, for example, a single offset paraboloid reflector.

Description of the Related Art

Modern day communication satellites, referred to as high throughput satellites (HTS), implement multiple beam coverage with spectrum reuse to increase the overall system capacity. Like in terrestrial cellular networks, the concept is to use a different part of the spectrum in adjacent beams to minimize interference while reusing the same part of the spectrum in non-adjacent beams to increase the number of communication channels available at any given time without extending the spectrum required, generally restricted through regulations. The reuse factor k, corresponding to the minimum number of cells or beams with different subsets of available spectrum, takes the values $k=i^2+ij+j^2$, where i and j are positive integers, to fill the complete multiple beam coverage with a repetition of the elementary cells without ever encountering two adjacent cells or beams with the same spectrum subset, sometimes referred to as a "color." Typical values for k are 3, 4, 7, 9, 12. HTS systems typically implement a reuse factor of 4, conveniently achieved combining polarization diversity and frequency diversity. In this particular case, the available spectrum in a given frequency band B1 is divided into two frequency sub-bands, F1, F2, and two orthogonal polarizations, P1, P2, typically left hand circular polarization (LHCP) and right hand circular polarization (RHCP), which are paired (combined) to generate four types of cells with non-interfering signals, (F1, P1), (F1, P2), (F2, P1) and (F2, P2), generally referred to as a four-color scheme. The resulting multiple beam coverage is characterized by two main directions, one along which the cells have alternating frequency sub-bands and another one along which the cells have alternating polarizations. This four-color scheme is generally applied in two distinct frequency bands, B1, B2, corresponding to the transmit and the receive frequency bands, as communication satellites typically implement frequency division duplex (FDD) techniques to enable full-duplex links. The beams are often distributed on a triangular lattice, as this configuration provides enhanced cross-over levels between adjacent beams resulting in higher aggregate performance at antenna level, specifically aggregate gain and aggregate carrier upon interferer ratio (C/I).

Next generation communication satellites, referred to as very high throughput satellites (VHTS) and ultra-high throughput satellites (UHTS), are expected to increase the total system capacity by at least an order of magnitude when compared to current generation HTS systems. This requires significantly more beams and more advanced antenna systems. Historically, antenna systems onboard communication satellites have relied on reflector technology. This solution provides higher gain and angular resolution, or smaller beamwidth, with moderate complexity when compared to direct radiating arrays, particularly when very high gain is required corresponding to electrically large antenna apertures.

To address the requirements of VHTS and UHTS systems, there is a need to develop new feed array solutions compatible with larger reflector sizes and providing a complete transmit/receive multiple beam coverage for full-duplex communication with a reduced number of apertures. Typical single-feed-per-beam reflector antenna configurations generate one beam from each feed of the array located in the focal plane of the reflector geometry. To achieve a reasonably high aperture efficiency, and avoid unnecessarily oversizing the reflector diameter, three or four reflector apertures are typically required to provide a multiple beam coverage with contiguous beams, assuming dual-band (transmit/receive) feeds are used.

Multiple-feed-per-beam reflector antenna configurations generate each beam from a cluster of feeds of the array located in the focal plane of the reflector geometry. Overlapping between the clusters (feed clusters) is required to produce contiguous beams with acceptable aggregate performance. This is generally achieved sharing feeds between adjacent clusters through adequate beamforming network design. Most feed array solutions reported are limited in frequency bandwidth, thus requiring two reflector antennas to produce a complete transmit/receive coverage, with one reflector antenna generally operating in each frequency band, B1, B2.

Furthermore, feeds shared in frequency between adjacent clusters operating in a same polarization impose constraints on the electromagnetic signal distribution achievable with the beamforming networks, requiring either a lossy design or a sub-optimal phase distribution. To avoid this issue, it is generally preferred to share feeds in polarization between adjacent clusters operating in a same frequency band, which enables independent control of the distribution coefficients, thus leading to optimal design of each cluster. However, this constrains the achievable cluster layouts, resulting in configurations either requiring two separate reflectors or with reduced aggregate performance at antenna level.

Furthermore, there is an interest to reduce the number of feeds per beam, enabling higher beam density, translating into higher throughput density over the coverage for a given reflector geometry, or to provide more flexibility in cluster overlapping layouts for enhanced aggregate performance at antenna level. There is also an interest in making such multiple-feed-per-beam antenna systems compatible with smaller platforms or as a secondary payload, where solutions based on a single reflector would be preferred to facilitate accommodation and fit in smaller launchers.

BRIEF SUMMARY

It is advantageous to obtain a more versatile dual-band multiple-feed-per-beam antenna system which addresses one or more of the problems of existing antenna systems in communication satellites.

In accordance with a first aspect of the present disclosure, a waveguide feed array is provided comprising overlapping clusters (feed clusters) of elementary feeds, each feed operating in at least two distinct frequency bands, B1, B2, with dual-polarization, P1, P2, in each band, corresponding to feeds with at least 4 waveguide ports each, two per said frequency band. That is, each feed may have one port for each pairing (combination) of frequency band and polarization (B1, P1), (B1, P2), (B2, P1) and (B2, P2). Further, the feeds of a given cluster may be connected through beamforming networks, one per frequency band. For each cluster of feeds, there may be (at least) two beamforming networks (BFNs), and each cluster may have (at least) two common ports serving as electrical interface to the structure at cluster level. The waveguide feed array may have a main longitudinal direction Z, substantially orthogonal to the plane of the aperture of the feed array defined by two main directions (main transverse directions) X, Y not necessarily orthogonal. The feeds may be arranged with their longitudinal directions substantially extending in parallel to the main longitudinal direction Z of the waveguide feed array.

Further, clusters may be offset with respect to each other, the offset comprising a translation (within the plane X, Y), a rotation (around the main longitudinal direction Z), and/or a symmetry (e.g., a symmetry operation or a mirror operation with respect to a plane including the main longitudinal direction Z). The offset may be such that, along a first direction X (first main direction), adjacent clusters may share at least one feed, said adjacent clusters using at a given frequency band different polarization ports of said shared feed. Further, the offset may be such that along a second direction Y (second main direction), adjacent clusters have no feeds in common.

Further, at least one feed of each cluster may be rotated around the main longitudinal direction Z with reference to the other feeds of said cluster.

It is understood that each feed comprises a plurality of interconnected microwave devices such as a radiating element, an orthomode junction, an orthomode transducer and/or duplexing filters configured to operate as a transition between guided waves and free space.

It is further understood that the feeds may have identical design, for example, with regard to the arrangement of ports, etc. Preferably, the ports of the feeds may be arranged according to the same pattern (port arrangement) for all feeds of the waveguide feed array. This pattern may have a discrete symmetry (e.g., mirror symmetry, central symmetry, or discrete rotational symmetry, such as rotation by 180°). Further, the discrete symmetry may be such that ports corresponding to different polarizations for a given frequency band map to each other under the discrete symmetry.

The above measures provide a multiple-feed-per-beam waveguide feed array which comprises at least three clusters of dual-band dual-polarization feeds with two clusters sharing at least one feed and other two clusters having no feeds in common, each cluster producing congruent transmit and receive beams, part of a multiple contiguous beam coverage enabling full-duplex communication, when combined with an adequate reflector antenna geometry. Preferably, the waveguide feed array is designed to produce hundreds of beams with a four-color reuse scheme. For example, the waveguide feed array may be a transmit/receive K/Ka-band feed array and may be used in a reflector antenna system on board a communication satellite providing broadband access.

It is known that multiple-feed-per-beam feed arrays producing a set of contiguous beams require a level of overlapping, or feed sharing, between adjacent clusters of feeds, as this overlapping determines the cross-over level between adjacent beams over the coverage or service area for a given reflector antenna geometry. This is a major design aspect to ensure homogeneous performance across the service area. Solutions have been reported using clusters of 7 feeds or more, up to 25 feeds per beam for example. These solutions typically require sharing feeds both in polarization and in frequency. Feed sharing in polarization is implemented taking advantage of the two distinct polarization ports per frequency band of each elementary feed. The respective beamforming networks of each cluster are thus connected to different feed ports and the feed sharing does not affect the design of said beamforming networks. On the contrary, feed sharing in frequency does require the beamforming networks of adjacent clusters to use the same feed port. Ideally, a diplexer would be required to separate a given feed port into two sub-band ports, e.g., (B1, P1) into (F1, P1) and (F2, P1). However, this would result in excessive design complexity, as diplexers are generally bulky. The preferred option is instead to use passive multi-mode components such as hybrid couplers to produce the overlapping. This comes at the expense of constraints in the achievable distribution coefficients produced by the beamforming networks, and in particular on the phase distribution. This leads to a sub-optimal design resulting in degraded antenna performance. Furthermore, feed array solutions with a large number of feeds per cluster require compact feeds, typically in the order of a wavelength, not compatible with typical transmit/receive feed designs, as the distance between adjacent clusters has a direct impact on the focal length of the reflector geometry. For these reasons, solutions reported with clusters of seven feeds or more are single-band designs and two reflector antennas are required, one for the transmit and one for the receive frequency bands.

To reduce drastically the complexity of the clusters, solutions with only three or four feeds per beam have been proposed. These solutions only share feeds in polarization, as sharing feeds in frequency would degrade substantially the aggregate antenna performance due to the larger ratio of shared feeds in frequency over the limited number of feeds per cluster. Typical solutions still make use of two reflector antennas, producing the beams in the two different frequency sub-bands from different apertures. One solution has been proposed using a single reflector to produce the contiguous beams with congruent coverage in transmit and receive. However, this comes at the expense of degraded antenna performance as the resulting rectangular beam lattice is sub-optimal.

Other solutions using a single large aperture have been reported. One solution consists in combining two single-band feed arrays through a frequency-selective sub-reflector, leading to a rather complex overall focal system. An alternative solution is the use of a single-feed-per-beam configuration with sub-optimal reflector illumination to achieve an acceptable overlap between adjacent beams. This comes at the expense of high spillover losses, typically in the order of 5 to 10 dB.

In accordance with the present disclosure as claimed, at least one feed of each cluster may be rotated around the main longitudinal direction Z with reference to the other feeds of said cluster. Arrays with elements rotated around the longitudinal direction may be known for specific applications. This technique is usually referred to as sequential rotation and applied to direct radiating arrays. Its main purpose is to reduce the cross-polarized component of the radiated electric field, e.g., the RHCP component for an electric field with its main component in LHCP, at array level taking advantage of the symmetries introduced by sequentially rotating the array elements. This technique is generally considered when the array element has poor cross-polarization performance.

For example, in a group of four patch antennas, the rotation angle around the longitudinal direction is incremented 90° when turning clock-wise. This also works with increments of −90° or applying the increment anti-clock-wise, as long as the beamforming network compensates for the phase progression such that all elementary signals add up coherently in the boresight direction. Elementary feeds for broadband satellite payloads generally have very low cross-polarization, and further reduction is not required. For this reason, this technique has never been applied to multiple-feed-per-beam feed array design.

As will be also elucidated elsewhere in this specification, the waveguide feed array according to the present disclosure is found to produce unexpected benefits, which include and are not limited to reducing beamforming network complexity, advantageous both for the electrical and the mechanical designs, as well as added flexibility in defining cluster layouts with enhanced performance at antenna level. The present disclosure further benefits from the use of compact dual-band dual-polarization feeds with a footprint that may fit in a lattice between two and three wavelengths at the highest operating frequency. For example, a waveguide feed array according to the present disclosure may be designed with a lattice between 20 and 30 mm for operation in K/Ka-band.

In an embodiment, at least one feed of each cluster may be rotated by 180° around the main longitudinal direction Z with reference to the other feeds of said cluster. This at least one feed may correspond to a feed that is shared between adjacent clusters of feeds. Preferably, the feed used as array element has the at least two ports pertaining to a given cluster operating in at least two distinct frequency bands, B1, B2, on a same side, and the remaining at least two ports pertaining to an adjacent cluster operating in the same at least two distinct frequency bands, B1, B2, located on an opposite side, the arrangement of the ports being characterized by a symmetry, such as a central symmetry or an axial symmetry, that further facilitates the design of the waveguide feed array and specifically of the beamforming networks. Communication satellite payloads generally implement orthogonal polarizations in transmit and receive frequency bands, as this provides further isolation for enhanced signal duplexing at terminal level. Thus, the pairs of ports on each side of the feed will preferably have orthogonal polarizations, e.g., (B1, P1) with (B2, P2) and (B1, P2) with (B2, P1). Combining this property with a rotation of at least one feed of each cluster may lead to beamforming networks that do not overlap between adjacent clusters, thus facilitating both the electrical and the mechanical designs. In particular, the beamforming networks of each cluster may be designed and manufactured as separate units, or as groups of adjacent units, facilitating the manufacturing and assembly of a complete waveguide feed array. Each cluster has at least two beamforming networks, one per operating frequency band, B1, B2, which may be interleaved to be manufactured as a single unit that does not overlap with that of adjacent clusters. Further, all beamforming networks of all feed clusters are identical and related to each other by at least one of translation, rotation, and/or symmetry along or around at least one of the directions X, Y, Z, thus reducing significantly the design effort. The beamforming networks feeding each clusters may comprise a combination of E-plane and H-plane power dividers or reactive T-junctions in combination with adequate waveguide routing to introduce a phase difference of 180° between feeds having different angular orientations around the main longitudinal direction Z with path lengths substantially equal from a common port to all distributed ports in order to achieve wide band operation. These properties may be used to define new cluster layouts improving performance at antenna level when compared to known solutions.

In an embodiment, an angular orientation around the main longitudinal direction Z of consecutive feeds along the first main direction X may alternate by 180°, whereas the angular orientation around the main longitudinal direction Z of consecutive feeds along the second main direction Y is invariant. In specific implementations thereof, the feeds may be arranged along parallel rows of feeds in the plane of the aperture of the waveguide feed array defined by the two main directions X, Y. The rows of feeds may extend, for example, in the second main direction Y. Then, an angular orientation of the feeds around the main longitudinal direction Z may be the same for all feeds within a given row of feeds. On the other hand, the angular orientation of the feeds along the main longitudinal direction Z may differ by a predefined angle between feeds in adjacent rows of feeds. In specific implementations, the orientation around the main longitudinal direction Z may vary by 180° between feeds in adjacent rows of feeds.

In an embodiment, each cluster may comprise three feeds, with one feed rotated 180° around the main longitudinal direction Z with reference to the other two feeds of said cluster. For example, the waveguide feed array may be designed with an equilateral triangular lattice well suited for circular feeds, the array spacing being essentially the feed diameter. Furthermore, the waveguide feed array aperture plane may be defined by two main directions X, Y, not necessarily orthogonal and here at an angle of 60°, substantially orthogonal to the main longitudinal direction Z. Adjacent clusters along a first direction X share one feed in polarization, corresponding to adjacent clusters along the first direction X operating in orthogonal polarizations, and are offset with respect to each other along the first direction X, the offset corresponding to a translation by one feed diameter along the first direction X with reference to the arrangement of the radiating elements of the feeds. The shared feed along the first direction X is advantageously rotated 180° around the main longitudinal direction Z, facilitating the design of the beamforming networks connected to said shared feed. Adjacent clusters along a second direction Y have no feeds in common, corresponding to adjacent clusters along the second direction Y operating in different frequency sub-bands, and are offset with respect to each other along the second direction Y, the offset corresponding to a translation by one and a half feed diameters along the second direction Y and a rotation of 180° around the main longitudinal direction Z of the cluster. Advantageously, the angular orientation around the main longitudinal direction Z of the feeds along the second direction Y is invariant (i.e., does not change when going along the second direction Y). Thus, with reference to a first cluster having one feed rotated 180° around the main longitudinal direction Z along the first direction X, a second cluster along the second direction Y, having no feeds in common with the first cluster, has two feeds rotated 180° around the main longitudinal direction Z. With reference to the second cluster, it may be considered that one feed is rotated 180° around the main longitudinal direction Z with reference to the other two feeds of said cluster. Further, the angular orientation around the main longitudinal direction Z of each cluster, with reference to the arrangement of the radiating elements of the feeds, is invariant along a first direction X, while the angular orientation around the main longitudinal direction Z of each feed cluster alternates 180° along a second direction Y, resulting in a waveguide feed array with regularly spaced feeds and regularly spaced feed clusters. Alternatively, the angular orientation around the main longitudinal direction Z of each cluster as well as the offset distance may vary along the first direction X, providing an irregular two-dimensional lattice of clusters with advantageous properties at antenna level.

In an embodiment, each cluster may comprise four feeds, with two feeds rotated 180° around the main longitudinal direction Z with reference to the other two feeds of said cluster. For example, the waveguide feed array may be designed with an equilateral triangular lattice well suited for circular feeds, the array spacing being essentially the feed diameter. Furthermore, the waveguide feed array aperture plane may be defined by two main directions X, Y, not necessarily orthogonal and here at an angle of 60°, substantially orthogonal to the main longitudinal direction Z. Adjacent clusters along a first direction X share one feed in polarization, corresponding to adjacent clusters along the first direction X operating in orthogonal polarizations, and are offset with respect to each other along the first direction X, the offset corresponding to a translation by one feed diameter along the first direction X with reference to the arrangement of the radiating elements of the feeds. The shared feed along the first direction X is advantageously rotated 180° around the main longitudinal direction Z, facilitating the design of the beamforming networks connected to said shared feed. Adjacent clusters along a second direction Y have no feeds in common, corresponding to adjacent clusters along the second direction Y operating in different frequency sub-bands, and are offset with respect to each other along the second direction Y, the offset corresponding to a translation by two times the feed diameter along the second direction Y. Advantageously, the angular orientation around the main longitudinal direction Z of the feeds along the second direction Y is invariant. This cluster layout may correspond to previously reported designs, with a lattice of clusters essentially rectangular having an aspect ratio of $\sqrt{3}$, where the distance along the second direction Y corresponds to a diagonal of said rectangular lattice. The feed arrangement with some feeds rotated around the main longitudinal direction Z facilitates greatly the design and implementation of the beamforming networks, which may be manufactured as separated units or as groups of adjacent units, simplifying the manufacturing and assembly of the complete waveguide feed array.

In an embodiment, each cluster may comprise four feeds, with two feeds rotated 180° around the main longitudinal direction Z with reference to the other two feeds of said cluster. For example, the waveguide feed array may be designed with an equilateral triangular lattice well suited for circular feeds, the array spacing being essentially the feed diameter. Furthermore, the waveguide feed array aperture plane may be defined by two main directions X, Y, not necessarily orthogonal and here at an angle of approximately 41°, substantially orthogonal to the main longitudinal direction Z. More precisely the cosine of the angle between the two main directions X, Y is equal to $2/\sqrt{7}$. Adjacent clusters along a first direction X share one feed in polarization, corresponding to adjacent clusters along the first direction X operating in orthogonal polarizations, and are offset with respect to each other along the first direction X, the offset corresponding to a translation by $\sqrt{7}/2$, or approximately 1.3, times the feed diameter along the first direction X and a rotation of 120° around the main longitudinal direction Z of the cluster with reference to the arrangement of the radiating elements of the feeds. The shared feed along the first direction X is advantageously rotated 180° around the main longitudinal direction Z, facilitating the design of the beamforming networks connected to said shared feed. Adjacent clusters along a second direction Y have no feeds in common, corresponding to adjacent clusters along the second direction Y operating in different frequency sub-bands, and are offset with respect to each other along the second direction Y, the offset corresponding to a translation by two times the feed diameter along the second direction Y. Advantageously, the angular orientation around the longitudinal direction Z of the feeds along the second direction Y is invariant. Further, the angular orientation around the longitudinal direction Z of each cluster, with reference to the arrangement of the radiating elements of the feeds, is alternating between 0° and 120° along a first direction X, while the angular orientation around the main longitudinal direction Z of each cluster remains invariant along a second direction Y, resulting in a waveguide feed array with regularly spaced feeds and regularly spaced feed clusters. The corresponding cluster layout is approximately a square lattice, providing a more regular arrangement when compared to previously reported layouts. As it will be elucidated elsewhere in this specification, this particular arrangement provides higher performance at antenna level, both in aggregate gain and C/I. Alternatively, the angular orientation around the main longitudinal direction Z of each cluster, with reference to the arrangement of the radiating elements of the feeds, may vary differently along the first direction X, providing an irregular two-dimensional lattice of clusters with different properties at antenna level.

In an embodiment, each cluster may comprise two feeds, with one feed rotated 180° around the main longitudinal direction Z with reference to the other feed of said cluster. For example, the waveguide feed array may be designed with an equilateral triangular lattice well suited for circular feeds, the array spacing being essentially the feed diameter. Furthermore, the waveguide feed array aperture plane may be defined by two main directions X, Y, not necessarily orthogonal and here at an angle of 60°, substantially orthogonal to the main longitudinal direction Z. Adjacent clusters along a first direction X share one feed in polarization, corresponding to adjacent clusters along the first direction X operating in orthogonal polarizations, and are offset with respect to each other along the first direction X, the offset corresponding to a translation by one feed diameter along the first direction X with reference to the arrangement of the radiating elements of the feeds. The shared feed along the first direction X is advantageously rotated 180° around the main longitudinal direction Z, facilitating the design of the beamforming networks connected to said shared feed. Adjacent clusters along a second direction Y have no feeds in common, corresponding to adjacent clusters along the second direction Y operating in different frequency sub-bands, and are offset with respect to each other along the second direction Y, the offset corresponding to a translation by one feed diameter along the second direction Y. Advantageously, the angular orientation around the main longitudinal direction Z of the feeds along the second direction Y is invariant. This particular arrangement provides more overlap between the clusters along the first direction X when compared to a single-feed-per-beam configuration using the same feeds and having the same lattice. As it will be elucidated elsewhere in this specification, this particular arrangement provides worse performance at antenna level when compared to alternative multiple-feed-per-beam configurations, but does provide higher beam density, which may be desirable for some applications with less demanding requirements on C/I.

It will be appreciated by those skilled in the art that two or more of the aforementioned embodiments may be combined to produce alternative cluster layouts with advantageous properties, at the expense of some added design complexity. For example, a waveguide feed array may combine clusters comprising two and three feeds in an irregular lattice of clusters as a compromise solution between two regular cluster arrangements. Alternatively, a waveguide feed array may combine clusters comprising three and four feeds in an irregular lattice of clusters as another compromise solution between two regular cluster arrangements. It is anticipated that as long as the feeds maintain an adequate arrangement, essentially with alternating angular orientation around the main longitudinal direction Z along a first direction X and invariant angular orientation around the main longitudinal direction Z along a second direction Y, it may be possible to design beamforming networks that do not overlap between adjacent clusters, thus facilitating the mechanical design and assembly of the complete waveguide feed array, as each beamforming network may be manufactured as separate units or as groups of adjacent units. Furthermore, all beamforming networks of all clusters of same size are identical and related to each other by at least one of translation, rotation, and/or symmetry along or around at least one of the main directions X, Y, Z, keeping the design effort moderate.

In a further aspect of the present disclosure, an antenna system is provided comprising at least one waveguide feed array as presently disclosed and a reflector antenna producing a coverage of multiple contiguous beams, congruent in the at least two frequency bands, B1, B2, typically a transmit and a receive frequency band, with polarization reuse along a first direction X', corresponding to the first direction X of the feed system along which at least one pair of adjacent clusters share at least one feed in polarization, and with frequency reuse along a second direction Y', corresponding to the second direction Y of the feed system along which adjacent clusters have no feeds in common. Furthermore, the reflector geometry may be an offset paraboloid and the waveguide feed array may be advantageously arranged to have its aperture, corresponding to the plane with directions X, Y, coinciding with the focal plane of the offset paraboloid, and the main longitudinal direction Z pointing approximately towards the center of the reflector. The spacing between feeds may be set between two and three wavelengths at the higher operating frequency, corresponding to a spacing between 20 and 30 mm in K/Ka band.

Modifications and variations of any one of the embodiments may be carried out by a person skilled in the art on the basis of the present description. In particular, the use of well-known size reduction techniques of common hollow waveguide cross-sections, such a ridged waveguide cross-section, may be considered to further reduce the footprint of the waveguide feed array, thus increasing the beam density or reducing the focal length of the antenna geometry. This may be advantageous on small platforms or for use as secondary payloads. Other transmission line technologies, such as stripline, may also be considered to further reduce the volume of the feed array while preserving the main characteristics and benefits of the present disclosure.

BRIEF DESCRIPTION OF THE SEVERAL VIEWS OF THE DRAWINGS

Further details, aspects, and embodiments will be described, by way of example, with reference to the drawings. Elements in the figures are illustrated for simplicity and clarity and have not necessarily been drawn to scale. In the Figures, elements which correspond to elements already described may have the same reference numerals. In the drawings.

REFERENCE SIGNS LIST

Figure 1A:
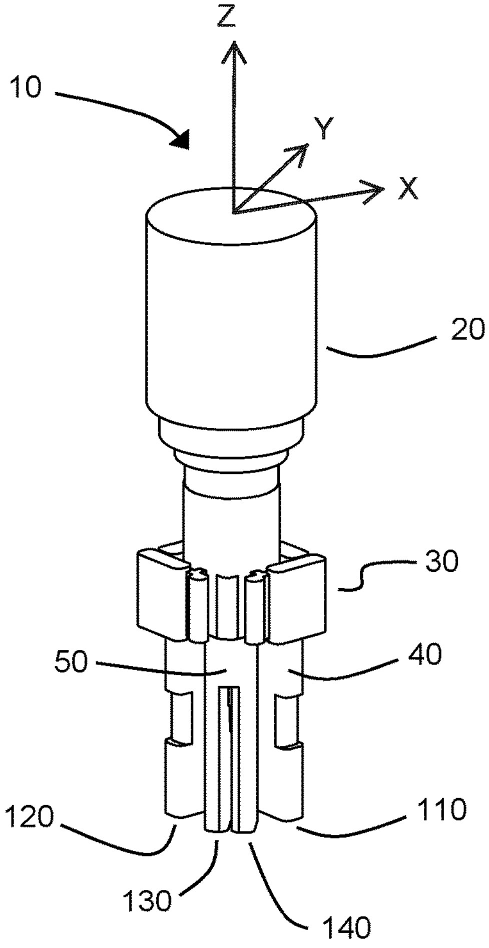
FIG. 1A shows an example of an elementary feed operating in two distinct frequency bands, with dual-polarization in each band.

The following list of references and abbreviations is provided for facilitating the interpretation of the drawings and shall not be construed as limiting the claims.

10 feed
20 stepped horn antenna
30 orthomode junction
40 hybrid coupler
50 septum polarizer
60 E-plane T-junction
70 H-plane T-junction
100 waveguide port arrangement
110 waveguide port in frequency band B1 and polarization P1
120 waveguide port in frequency band B1 and polarization P2
130 waveguide port in frequency band B2 and polarization P1
140 waveguide port in frequency band B2 and polarization P2
150 common waveguide port of a beamforming network operating in a first frequency band B1
160 common waveguide port of a beamforming network operating in a second frequency band B2
200 waveguide feed array
300 cluster comprising three feeds
310 beamforming network unit of a cluster comprising three feeds
311 beamforming network of a cluster comprising three feeds and operating in a first frequency band B1
312 beamforming network of a cluster comprising three feeds and operating in a second frequency band B2
400 cluster comprising four feeds
410 beamforming network unit of a cluster comprising four feeds
411 beamforming network of a cluster comprising four feeds and operating in a first frequency band B1
412 beamforming network of a cluster comprising four feeds and operating in a second frequency band B2
500 Multi-layer assembly of a beamforming network unit of a cluster comprising three feeds
600 reflector antenna

DETAILED DESCRIPTION

While the presently disclosed subject matter is susceptible of embodiment in many different forms, there are shown in the drawings and will herein be described in detail one or more specific embodiments, with the understanding that the present disclosure is to be considered as exemplary of the principles of the presently disclosed subject matter and not intended to limit it to the specific embodiments shown and described.

In the following, for the sake of understanding, elements of embodiments are described in operation. However, it will be apparent that the respective elements are arranged to perform the functions being described as performed by them. In addition, to facilitate visualization of the operating waveguides, drawings illustrate the inner waveguide cavities, rather than the surrounding electrically conductive material or electrical conductor, unless otherwise stated. For example, waveguide ports may refer to electrical interfaces with corresponding flanges although not explicitly shown when inner waveguide cavities are illustrated.

Further, the presently disclosed subject matter is not limited to the embodiments, as features described herein or recited in mutually different dependent claims may be combined.

Waveguide Feed Array

Figure 1B:
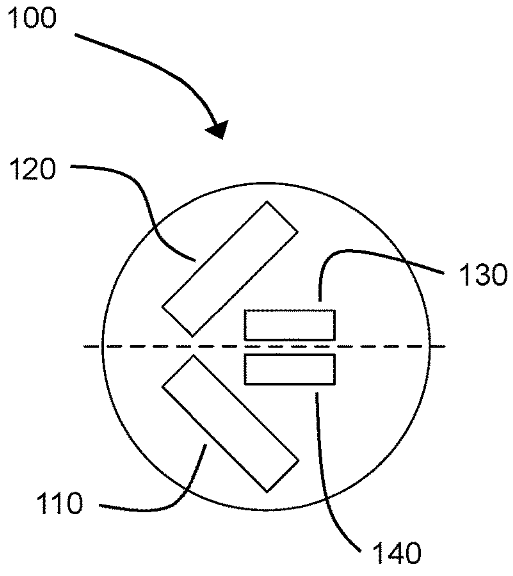
FIG. 1B shows an example of port arrangement in an elementary 4-port feed operating in two distinct frequency bands, with dual-polarization in each band.
Figure 1C:
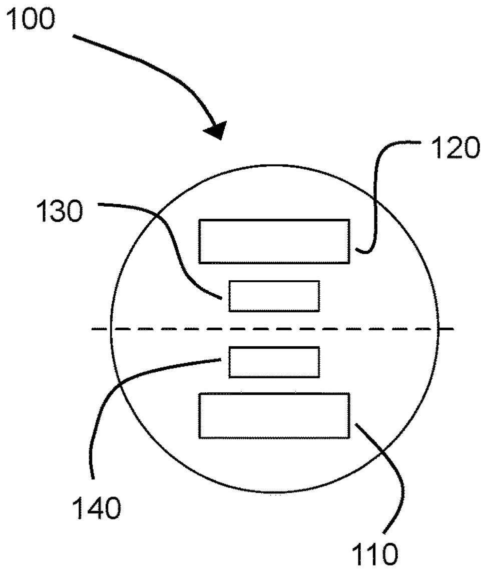
FIG. 1C shows an example of an alternative port arrangement in an elementary 4-port feed operating in two distinct frequency bands, with dual-polarization in each band.

FIG. 1A shows a 3D model of a compact dual-band dual-polarization feed system 10 comprising a stepped horn antenna 20 and an orthomode junction 30. The feed operates in two distinct frequency bands, B1, B2, and provides dual-polarization, P1, P2, in each band. The orthomode junction 30 combined with the hybrid coupler 40 produces two orthogonal circular polarizations, right hand circular polarization (RHCP) and left hand circular polarization (LHCP), in the first frequency band, B1, corresponding to a lower frequency band. The orthomode junction 30 combined with the septum polarizer 50 produces two orthogonal circular polarizations in the second frequency band, B2, corresponding to a higher frequency band. Thus, the feed system has four waveguide ports 110, 120, 130, 140, each corresponding to a pairing of a frequency band and a polarization, (B1, P1), (B1, P2), (B2, P1), (B2, P2). The feed system 10 has a main longitudinal direction Z, substantially orthogonal to the plane of the aperture of the stepped horn antenna defined by two main directions X, Y, not necessarily orthogonal. This feed system 10 is only for illustration purposes and other types of feed systems may be considered, as long as they provide also (at least) four ports 110, 120, 130, 140. For example, the stepped horn antenna 20 may be replaced by another type of radiating element, such as a corrugated horn or a spline horn. The two-probe orthomode junction 30 may also be replaced by another type of orthomode junction, such as a four-probe orthomode junction. Similarly, the septum polarizer 50 may be replaced by another type of orthomode transducer such as a turnstile orthomode transducer. As an example, the feed system 10 may be a K/Ka-band feed design with an outer diameter between 20 and 30 mm, fitting in an equilateral triangular lattice suitable for waveguide feed arrays in broadband satellite payloads. FIG. 1B and FIG. 1C illustrate possible waveguide port arrangements 100 suitable in combination with the present disclosure. For example, FIG. 1B illustrates the specific waveguide port arrangement 100 of the feed system 10 illustrated in FIG. 1A. In this particular case, the waveguide ports 130, 140, corresponding to the two polarization ports in the higher frequency band B2 with smaller waveguide cross-section, are parallel to a given axis of symmetry, schematically represented with a dashed line, while the waveguide ports 110, 120, corresponding to the two polarization ports in the lower frequency band B1 with larger waveguide cross-section, are inclined with respect to that same axis of symmetry. The waveguide ports 120, 130 are symmetric of the waveguide ports 110, 140 with respect to the symmetry axis, schematically represented with a dashed line. Preferably, the symmetry axis coincides with a diameter of the feed outer circular rim, substantially orthogonal to and centered on the main longitudinal direction Z, and is further aligned with a main direction Y. Another waveguide port arrangement 100 corresponding to a different type of feed system 10 is illustrated in FIG. 1C. In this particular case, all waveguide ports 110, 120, 130, 140, are aligned with a given axis of symmetry, also schematically represented with a dashed line. The waveguide ports 120, 130 are symmetric of the waveguide ports 110, 140 with respect to the axis of symmetry. In this particular case, the port arrangement also presents a rotational symmetry by rotation of 180° around the main longitudinal direction Z, or a central symmetry with reference to the center of the circular stepped horn antenna. In general, the port arrangement (port pattern) may have a discrete symmetry, wherein waveguide ports relating to the same frequency band but to different polarization map to each other under the discrete symmetry.

Figure 2A:
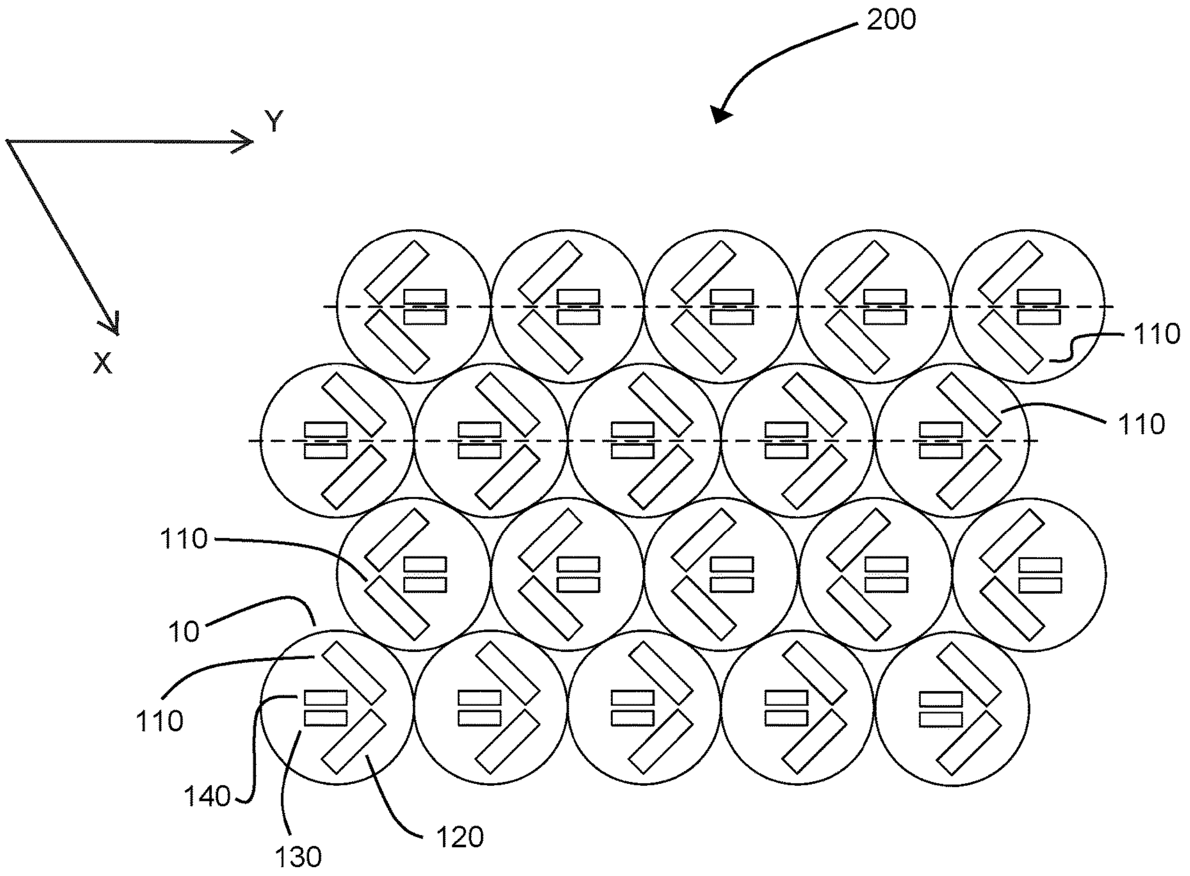
FIG. 2A shows an example of a waveguide feed array with circular elements in an equilateral triangular lattice according to an embodiment of the present disclosure.

Preferably, the ports on a same side of the axis of symmetry have orthogonal polarizations, as typical communication satellite payloads implement orthogonal polarizations in transmit and receive frequency bands, providing further isolation for enhanced signal duplexing at terminal level. For example, the waveguide port 110 and the waveguide port 140 may correspond to the pairing (B1, P1) and (B2, P2), respectively, while the waveguide port 120 and the waveguide port 130 correspond to (B1, P2) and (B2, P1), respectively. This waveguide port arrangement may further facilitate the design of the beamforming networks, and in particular avoid overlapping between beamforming networks of adjacent clusters. Other waveguide port arrangements 100 may be suitable in combination with the present disclosure, while arrangements having central and/or axial symmetry are preferred to simplify further the design of the waveguide feed array and beamforming networks. FIG. 2A shows an example of a waveguide feed array 200 according to an embodiment of the present disclosure, comprising multiple circular feeds 10 distributed on an equilateral triangular lattice defined by two main directions X, Y, at an angle of 60°. The main longitudinal direction Z is substantially orthogonal to the plane with main directions (main transverse directions) X, Y. The feeds 10 all comprise 4 ports 110, 120, 130, 140 numbered clockwise, the two first ports 110, 120 corresponding to a first frequency band B1, and the two remaining ports 130, 140 corresponding to a second frequency band B2. The angular orientation of the feeds 10 around the main longitudinal direction Z alternates by 180° along the first direction X (i.e., alternates by 180° when going along the first main direction X), and remains invariant along the second direction Y (i.e., remains invariant when going along the second main direction Y). With this arrangement, all feeds in a row along the second direction Y share a same axis of symmetry, schematically represented with dashed lines. For instance, the feeds in a row may have the same port arrangement with the same angular orientation thereof. Conveniently, equivalent waveguide ports of adjacent feeds 10, corresponding to a same frequency band and a same polarization, are located next to each other. This is illustrated with two adjacent feeds 10 having their respective waveguide ports 110 next to each other. Implementing a cluster layout with feeds shared in polarization along the first direction X and no feeds in common along the second direction Y, corresponding to polarization reuse and frequency reuse respectively, may be facilitated with this waveguide feed array 200 arrangement. Beamforming networks designed to fit between two axes of symmetry of adjacent rows of feeds will not overlap, thus enabling these components to be manufactured as separate units or as group of adjacent units. It is to be understood that the specific arrangement of ports (port pattern) shown in FIG. 2A shall not be understood as limiting. For example, it may be sufficient if the arrangement of ports has a (discrete) symmetry as explained above in the context of FIG. 1B and FIG. 1C.

Figure 2B:
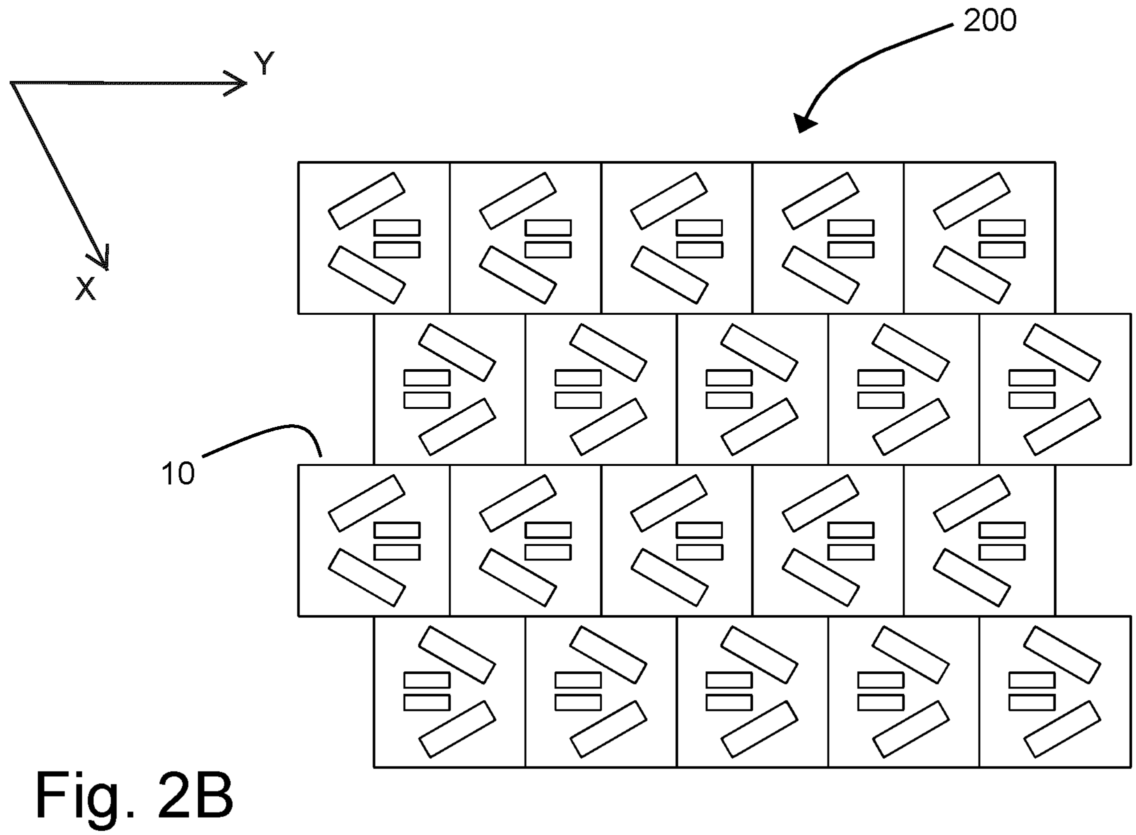
FIG. 2B shows an example of a waveguide feed array with square elements in a triangular lattice according to an embodiment of the present disclosure.
Figure 2C:
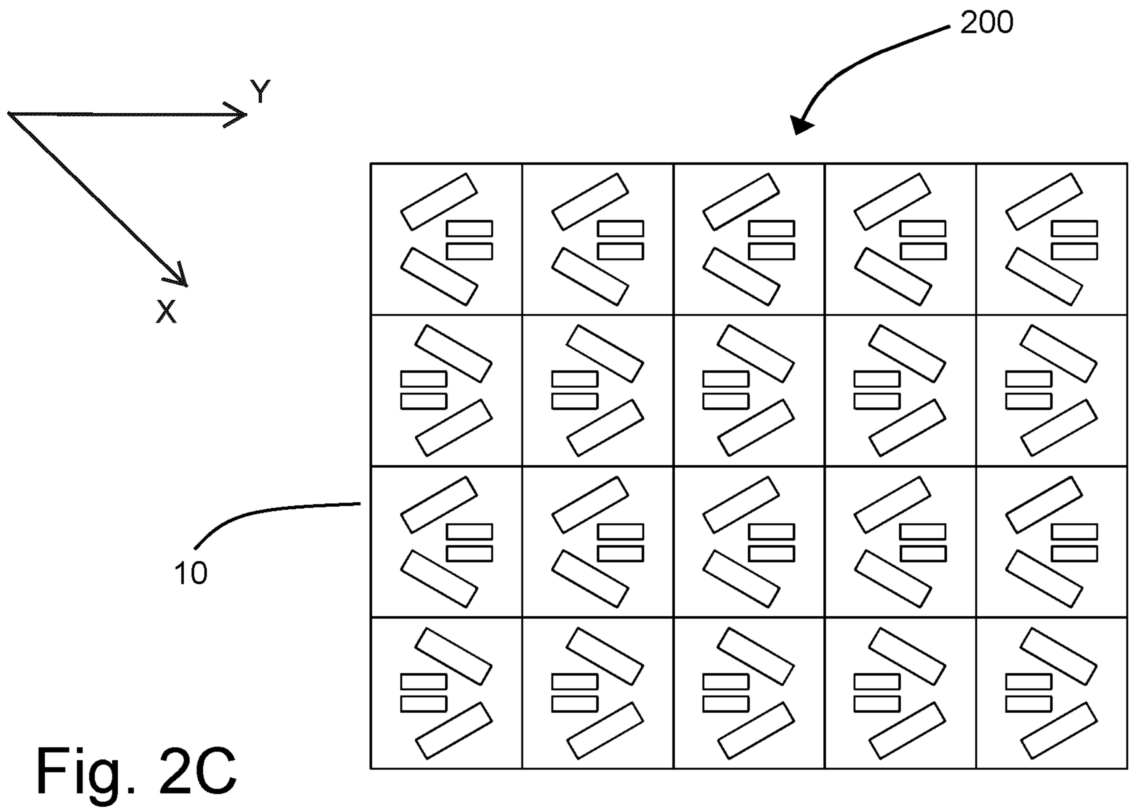
FIG. 2C shows an example of a waveguide feed array with square elements in a square lattice according to an embodiment of the present disclosure.

FIG. 2B and FIG. 2C illustrate alternative waveguide feed array 200 configurations according to embodiments of the present disclosure. Specifically, FIG. 2B illustrates a waveguide feed array 200 comprising square feeds 10 in a triangular lattice. Because of the shape of the elementary feed, the lattice is based on isosceles triangles instead of equilateral ones as in the configuration illustrated in FIG. 2A. As known in the field, this may be used to adjust the cluster lattice, thus improving the beam lattice produced by the antenna system comprising the waveguide feed array 200. The angle between the two main directions X, Y of the array is approximately 63°. More precisely, the tangent of the angle between the two main directions X, Y is equal to 2. Alternatively, FIG. 2C illustrates a waveguide feed array 200 comprising square feeds 10 in a square lattice. The angle between the two main directions X, Y of the waveguide feed array 200 is 45°. In both waveguide feed array 200 configurations, the angular orientation of the feeds 10 around the main longitudinal direction Z alternate 180° along the first direction X and remains invariant along the second direction Y.

Figure 3A:
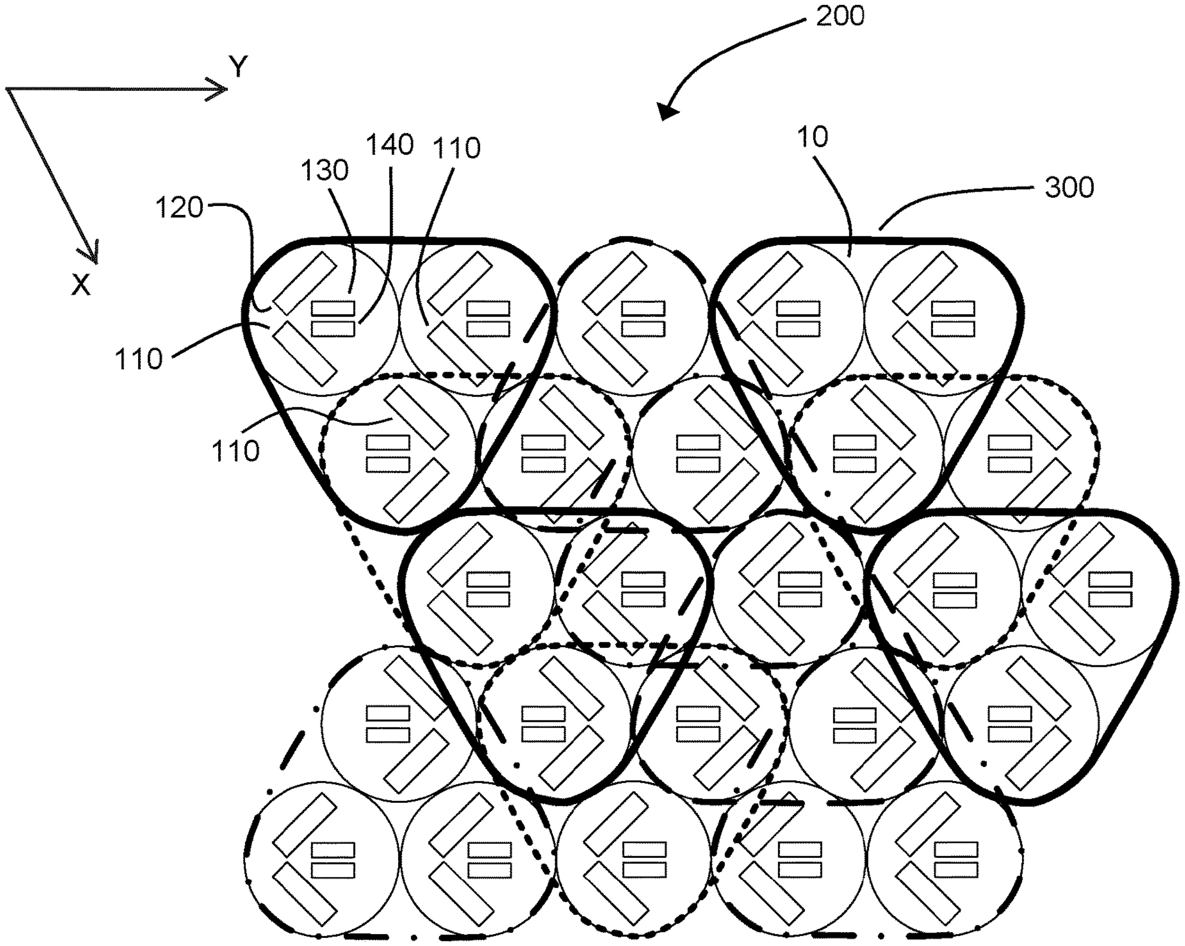
FIG. 3A shows an example of a regular cluster layout where all clusters comprise three feeds according to an embodiment of the present disclosure.

FIG. 3A shows a waveguide feed array 200 with a cluster layout according to an embodiment of the present disclosure wherein each cluster 300 comprises exactly three feeds 10. The waveguide feed array 200 comprises multiple feeds 10 distributed in an equilateral triangular lattice with a spacing corresponding to one feed diameter. Four different clusters 300, marked with different line styles, are repeated in a regular cluster lattice corresponding to a four-color scheme with frequency and polarization reuse.

In each frequency band, B1, B2, the spectrum is further divided into two sub-bands, F1, F2, combined with two orthogonal polarizations, P1, P2, to produce a four-color scheme. Adjacent clusters 300 along a first direction X share one feed 10 and are offset with respect to each other along the first direction X, the offset corresponding to a translation by one feed diameter along the first direction X with reference to the arrangement of the radiating elements of the feeds. The shared feed 10 is advantageously rotated 180° around the main longitudinal direction Z. Adjacent clusters 300 along the direction X with a shared feed 10 operate in orthogonal polarizations.

For example, in the lower frequency band B1, the first cluster 300, marked with a thick solid line, may correspond to the pairing (F1, P1), while the adjacent cluster 300, marked with a dotted line, may correspond to the pairing (F1, P2). In the upper frequency band B2, the polarizations may be inverted as usually implemented in communication satellite systems. The cluster layout alternates these two types of clusters 300 along the first direction X. With the rotated feeds 10, the offset between adjacent clusters 300 along the first direction X may be better described as a combination of a translation by one feed diameter along the first direction X and a reflection with reference to a symmetry plane orthogonal to the second direction Y.

The benefits of rotating feeds 10 around the main longitudinal direction Z is particularly evident along the first direction X. This is illustrated with particular focus on the waveguide ports 110 of each feeds 10 of a cluster 300 marked with a thick solid line, which all operate in the same frequency band B1 and the same polarization P1. All three waveguide ports 110 of a cluster 300 are next to each other, facilitating the design of the corresponding beamforming network. Clusters 300 along a second direction Y have no feeds 10 in common and are offset with respect to each other along the second direction Y, the offset in this case corresponding to a translation by one and a half feed diameters along the second direction Y and a rotation of 180° around the main longitudinal direction Z of the clusters 300. The rotated feed 10 in this case is such that the angular orientation of the feeds around the main longitudinal direction Z is invariant along the second direction Y. Adjacent clusters 300 along the second direction Y with no feeds in common advantageously operate in the same polarization but in different frequency sub-bands. For example, in the lower frequency band B1, the first cluster 300, marked with a thick solid line, may correspond to the pairing (F1, P1), while the adjacent cluster 300, marked with a dashed line, may correspond to the pairing (F2, P1).

The four-color scheme is completed by a fourth type of cluster 300, marked with a dash-dotted line, which may correspond to the pairing (F2, P2). With this cluster layout, polarization reuse is implemented along the first direction X, while frequency reuse is implemented along the second direction Y. As can be seen, the resulting lattice of clusters 300 is approximately square with a side along the first direction X, while the second direction Y corresponds to a diagonal. Identical clusters 300, operating in a same frequency band and a same polarization, are distributed in a rectangular lattice with a much shorter distance between identical clusters 300 along the first direction X, which is sub-optimal for aggregate performance at antenna level. This may be improved introducing some irregularity in the cluster layout.

In general, a shape (or angular orientation around the main longitudinal direction Z) in terms of the arrangement of the radiating elements of the feeds of clusters may alternate by 180° from one cluster to the next when going along the second main direction Y. On the other hand, the shape of clusters may be invariant when going along the first main direction X.

Figure 3B:
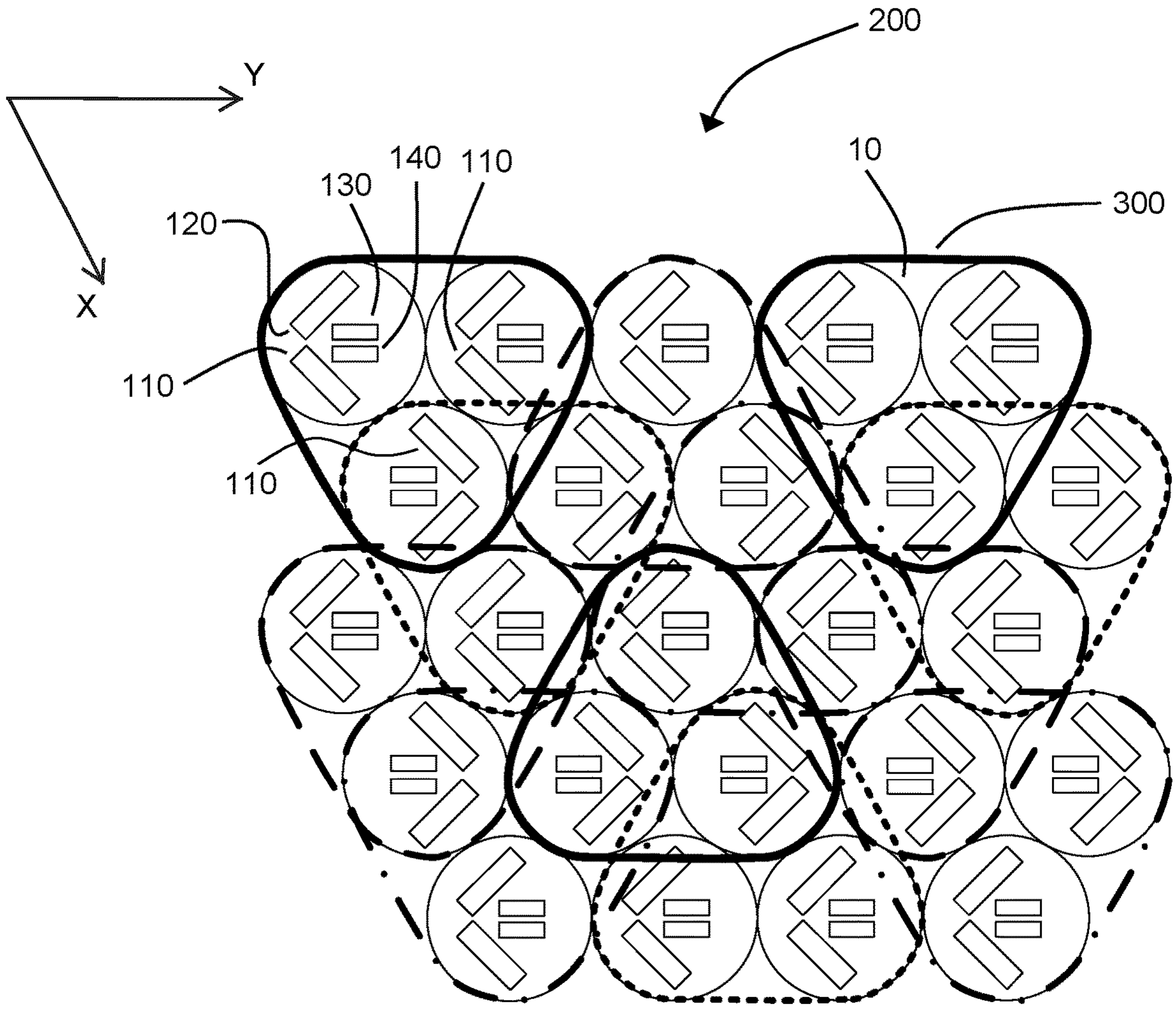
FIG. 3B shows an example of an irregular cluster layout where all clusters comprise three feeds according to an embodiment of the present disclosure.

FIG. 3B shows a waveguide feed array 200 with a cluster layout according to an embodiment of the present disclosure wherein each cluster 300 comprises exactly three feeds 10. The waveguide feed array 200 comprises multiple feeds 10 distributed in an equilateral triangular lattice with a spacing corresponding to one feed diameter. Four different clusters 300, marked with different line styles, are repeated in an irregular cluster lattice corresponding to a four-color scheme with frequency and polarization reuse. In each frequency band, B1, B2, the spectrum is further divided into two sub-bands, F1, F2, combined with two orthogonal polarizations, P1, P2, to produce a four-color scheme. Clusters 300 along a first direction X display an irregular pattern with some adjacent clusters 300 sharing one feed 10 and some having no feeds in common. For example, in the lower frequency band B1, the first cluster 300, marked with a thick solid line, may correspond to the pairing (F1, P1), while the adjacent cluster 300, marked with a dotted line, may correspond to the pairing (F1, P2). These two clusters 300 share one feed advantageously rotated 180° around the longitudinal direction Z. The following cluster 300 along the first direction X, marked with a thick solid line and which may correspond to the pairing (F1, P1), has no feeds in common with the cluster 300 marked with a dotted line and is rotated by 180° with reference to the first cluster 300 marked with a thick solid line. Clusters 300 along a second direction Y have no feeds in common and are offset with respect to each other along the second direction Y, the offset in this case corresponding to a translation by one and a half feed diameters along the second direction Y and a rotation of 180° around the main longitudinal direction Z of the clusters 300. The rotated feed 10 in this case is such that the angular orientation of the feeds 10 around the main longitudinal direction Z is invariant along the second direction Y.

Adjacent clusters 300 along the second direction Y with no feeds in common advantageously operate in the same polarization but in different frequency sub-bands. For example, in the lower frequency band B1, the first cluster 300, marked with a thick solid line, may correspond to the pairing (F1, P1), while the adjacent cluster 300, marked with a dashed line, may correspond to the pairing (F2, P1). The four-color scheme is completed by a fourth type of cluster 300, marked with a dash-dotted line, which may correspond to the pairing (F2, P2). With this irregular cluster layout, polarization reuse is implemented along the first direction X, while frequency reuse is implemented along the second direction Y. As can be seen, the resulting lattice of clusters 300 remains approximately square although slightly irregular, with a side along the first direction X, while the second direction Y corresponds to a diagonal. However, the arrangement of clusters 300 in the same color, for example, the clusters 300 marked with thick solid lines, are now in a slightly irregular triangular lattice. As it will be also elucidated elsewhere in this specification, this irregular lattice of clusters benefits performance at antenna level and in particular aggregate gain and C/I.

Figure 4A:
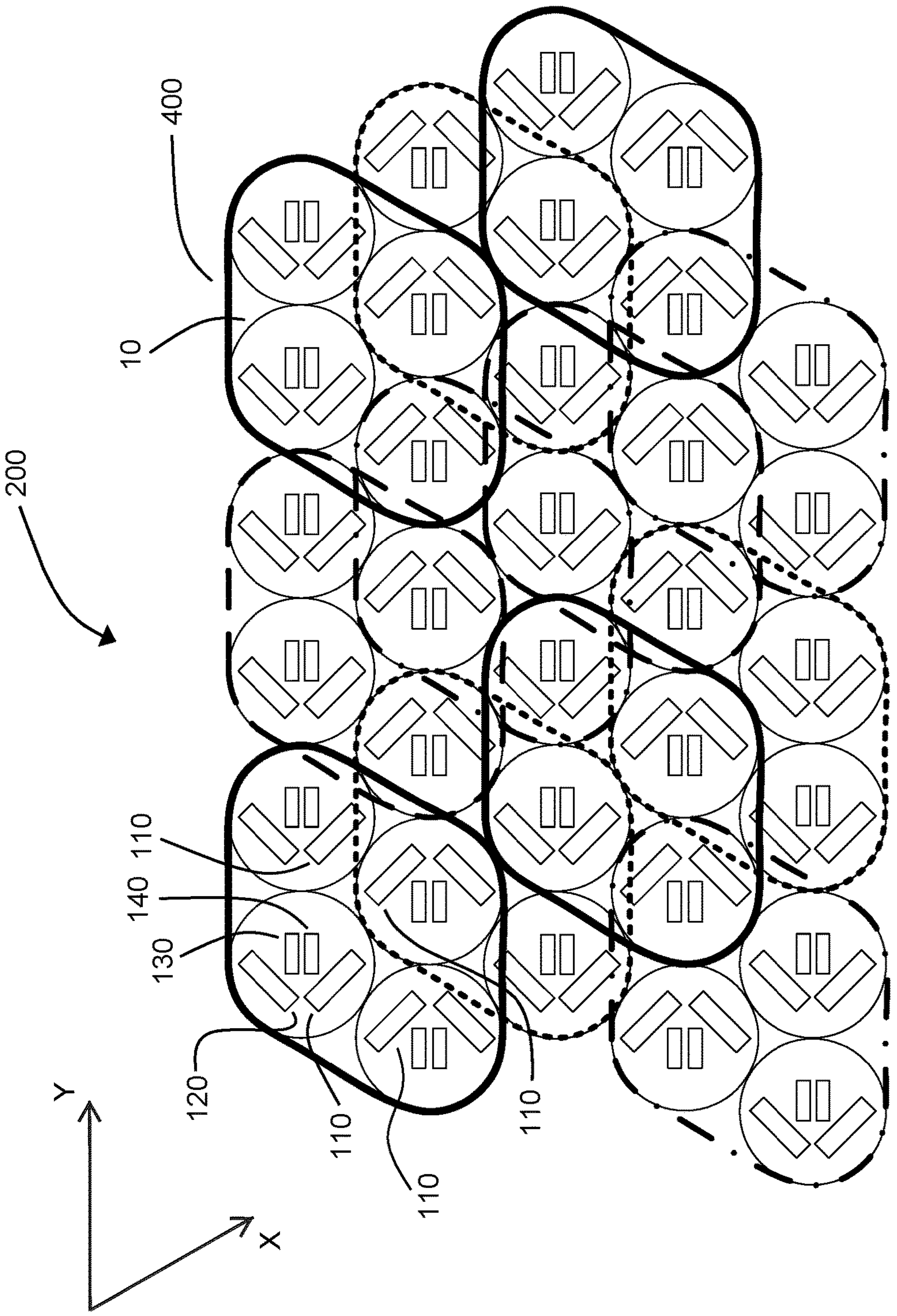
FIG. 4A shows an example of a regular cluster layout where all clusters comprise four feeds according to an embodiment of the present disclosure.

FIG. 4A shows a waveguide feed array 200 with a cluster layout according to an embodiment of the present disclosure wherein each cluster 400 comprises exactly four feeds 10. The waveguide feed array 200 comprises multiple feeds 10 distributed in an equilateral triangular lattice with a spacing corresponding to one feed diameter. Four different clusters 400, marked with different line styles, are repeated in a regular cluster lattice corresponding to a four-color scheme with frequency and polarization reuse.

In each frequency band, B1, B2, the spectrum is further divided into two sub-bands, F1, F2, combined with two orthogonal polarizations, P1, P2, to produce a four-color scheme. Adjacent clusters 400 along a first direction X share one feed 10 and are offset with respect to each other along the first direction X, the offset corresponding to a translation by one feed diameter along the first direction X with reference to the arrangement of the radiating elements of the feeds. The shared feed 10 is advantageously rotated 180° around the main longitudinal direction Z, as well as the adjacent feed 10 of the same cluster 400 along the second direction Y, advantageously shared with a further adjacent cluster 400 along a third direction in the plane defined by the main directions X, Y. Adjacent clusters 400 along the direction X with a shared feed 10 advantageously operate in orthogonal polarizations.

For example, in the lower frequency band B1, the first cluster 400, marked with a thick solid line, may correspond to the pairing (F1, P1), while the adjacent cluster 400, marked with a dotted line, may correspond to the pairing (F1, P2). In the upper frequency band B2, the polarizations may be inverted as usually implemented in communication satellite systems. The cluster layout alternates these two types of clusters 400 along the first direction X. With the rotated feeds 10, the offset between adjacent clusters 300 along the first direction X may be better described as a combination of a translation by one feed diameter along the first direction X, a reflection with reference to a symmetry plane orthogonal to the second direction Y and a further reflection with reference to a symmetry plane defined by the directions Y, Z.

The benefits of rotating feeds 10 around the main longitudinal direction Z is particularly evident along the first direction X. This is illustrated with particular focus on the waveguide ports 110 of each feeds of a cluster 400 marked with a thick solid line, which all operate in the same frequency band B1 and the same polarization P1. All four waveguide ports 110 of a cluster 400 are next to each other, facilitating the design of the corresponding beamforming network. Clusters 400 along a second direction Y have no feeds in common and are offset with respect to each other along the second direction Y, the offset in this case corresponding to a translation by two times the feed diameter along the second direction Y. The angular orientation of the feeds 10 around the longitudinal direction Z is invariant along the second direction Y. Adjacent clusters 400 along the second direction Y with no feeds in common advantageously operate in the same polarization but in different frequency sub-bands.

For example, in the lower frequency band B1, the first cluster 400, marked with a thick solid line, may correspond to the pairing (F1, P1), while the adjacent cluster 400, marked with a dashed line, may correspond to the pairing (F2, P1). The four-color scheme is completed by a fourth type of cluster 400, marked with a dash-dotted line, which may correspond to the pairing (F2, P2). With this cluster layout, polarization reuse is implemented along the first direction X, while frequency reuse is implemented along the second direction Y. As can be seen, the resulting lattice of clusters 400 is essentially rectangular with a side along the first direction X, while the second direction Y corresponds to a diagonal. This rectangular lattice has an aspect ratio of $\sqrt{3}$, which also applies to the lattice of identical clusters 400, the shorter distance being along the first direction X. This cluster layout corresponds to a previously disclosed layout. However, the angular orientation of the feeds 10 around the main longitudinal direction Z according to an embodiment of the present disclosure may facilitate the design of the beamforming networks. In particular, beamforming networks may be manufactured as separate units or group of adjacent units as their design may be such that beamforming networks of adjacent clusters 400 do not overlap.

Figure 4B:
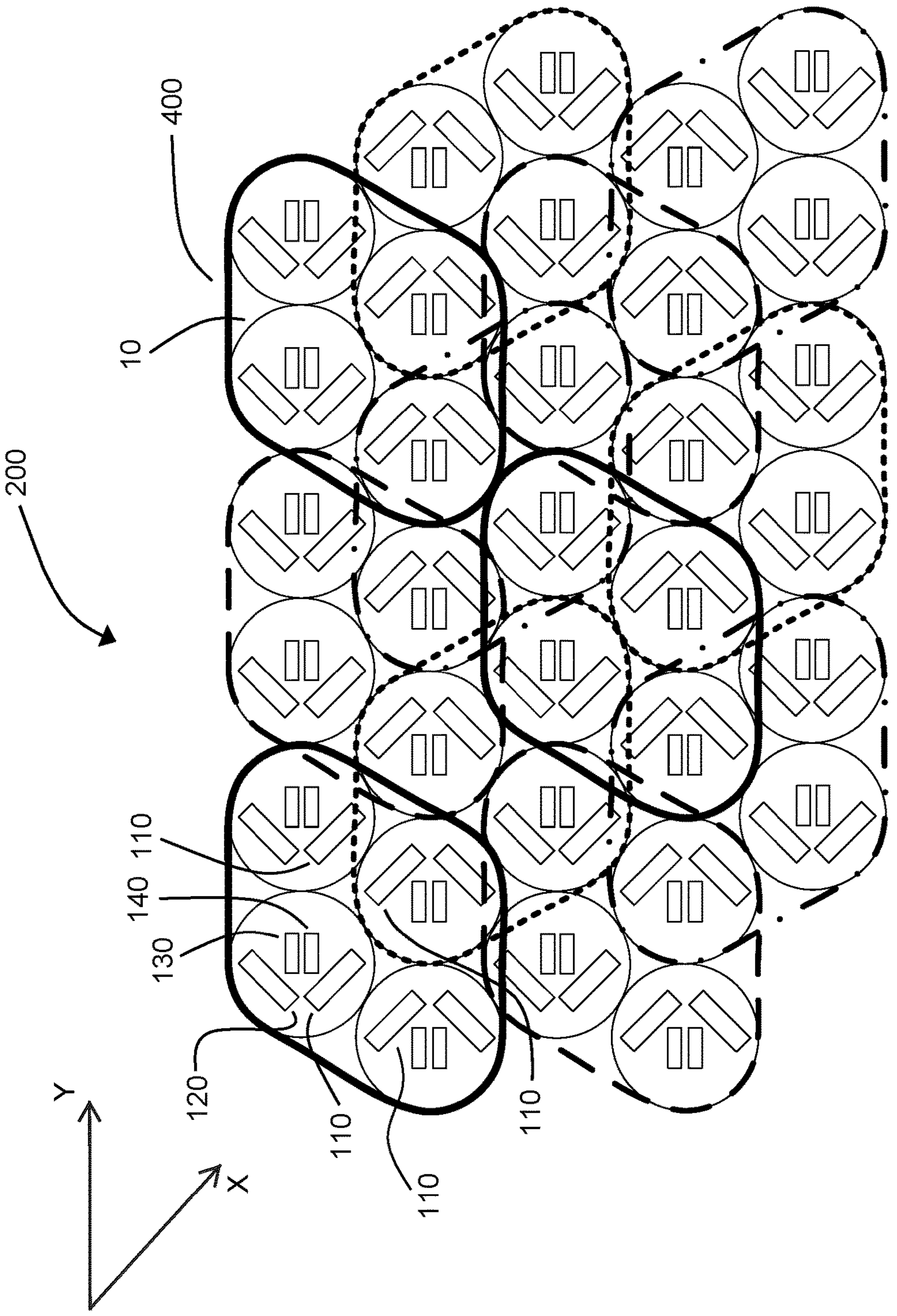
FIG. 4B shows an example of an alternative regular cluster layout where all clusters comprise four feeds according to an embodiment of the present disclosure.

FIG. 4B shows a waveguide feed array 200 with a cluster layout according to an embodiment of the present disclosure wherein each cluster 400 comprises exactly four feeds 10. The waveguide feed array 200 comprises multiple feeds 10 distributed in an equilateral triangular lattice with a spacing corresponding to one feed diameter. Four different clusters 400, marked with different line styles, are repeated in an irregular cluster lattice corresponding to a four-color scheme with frequency and polarization reuse.

In each frequency band, B1, B2, the spectrum is further divided into two sub-bands, F1, F2, combined with two orthogonal polarizations, P1, P2, to produce a four-color scheme. Adjacent clusters 400 along a first direction X share one feed 10 and are offset with respect to each other along the first direction X, the offset corresponding to a translation by $\sqrt{7}/2$, or approximately 1.3, times the feed diameter along the first direction X and a rotation of 120° around the main longitudinal direction Z of the cluster 400 with reference to the arrangement of the radiating elements of the feeds. The shared feed 10 is advantageously rotated 180° around the main longitudinal direction Z, as well as the adjacent feed 10 of the same cluster 400 along the second direction Y, advantageously shared with a further adjacent cluster 400 along a third direction in the plane defined by the main directions X, Y. Adjacent clusters 400 along the direction X with a shared feed 10 advantageously operate in orthogonal polarizations.

For example, in the lower frequency band B1, the first cluster 400, marked with a thick solid line, may correspond to the pairing (F1, P1), while the adjacent cluster 400, marked with a dotted line, may correspond to the pairing (F1, P2). In the upper frequency band B2, the polarizations may be inverted as usually implemented in communication satellite systems. The cluster layout alternates these two types of clusters 400 along the first direction X. With the rotated feeds 10, the offset between adjacent clusters 400 may be better described as a combination of a translation by $\sqrt{7}/2$ times the feed diameter along the first direction X and a reflection with reference to a symmetry plane orthogonal to the second direction Y. The benefit of rotating feeds 10 around the longitudinal direction Z is particularly evident along the first direction X. This is illustrated with particular focus on the waveguide ports 110 of each feeds of a cluster 400 marked with a thick solid line, which all operate in the same frequency band B1 and the same polarization P1.

All four waveguide ports 110 of a cluster 400 are next to each other, facilitating the design of the corresponding beamforming network. Clusters 400 along a second direction Y have no feeds in common and are offset with respect to each other along the second direction Y, the offset in this case corresponding to a translation by two times the feed diameter along the second direction Y. The rotated feeds 10 in this case are such that the angular orientation of the feeds 10 around the main longitudinal direction Z is invariant along the second direction Y. Adjacent clusters 400 along the second direction Y with no feeds in common advantageously operate in the same polarization but in different frequency sub-bands.

For example, in the lower frequency band B1, the first cluster 400, marked with a thick solid line, may correspond to the pairing (F1, P1), while the adjacent cluster 400, marked with a dashed line, may correspond to the pairing (F2, P1). The four-color scheme is completed by a fourth type of cluster 400, marked with a dash-dotted line, which may correspond to the pairing (F2, P2). With this cluster layout, polarization reuse is implemented along the first direction X, while frequency reuse is implemented along the second direction Y. The resulting lattice of clusters is approximately square, with a side along the first direction X, providing enhanced aggregate performance at antenna level compared to the layout of FIG. 4A. Beamforming networks of each cluster 400 may be manufactured as separate units or group of adjacent units as their design may be such that beamforming networks of adjacent clusters 400 do not overlap.

Figure 5:
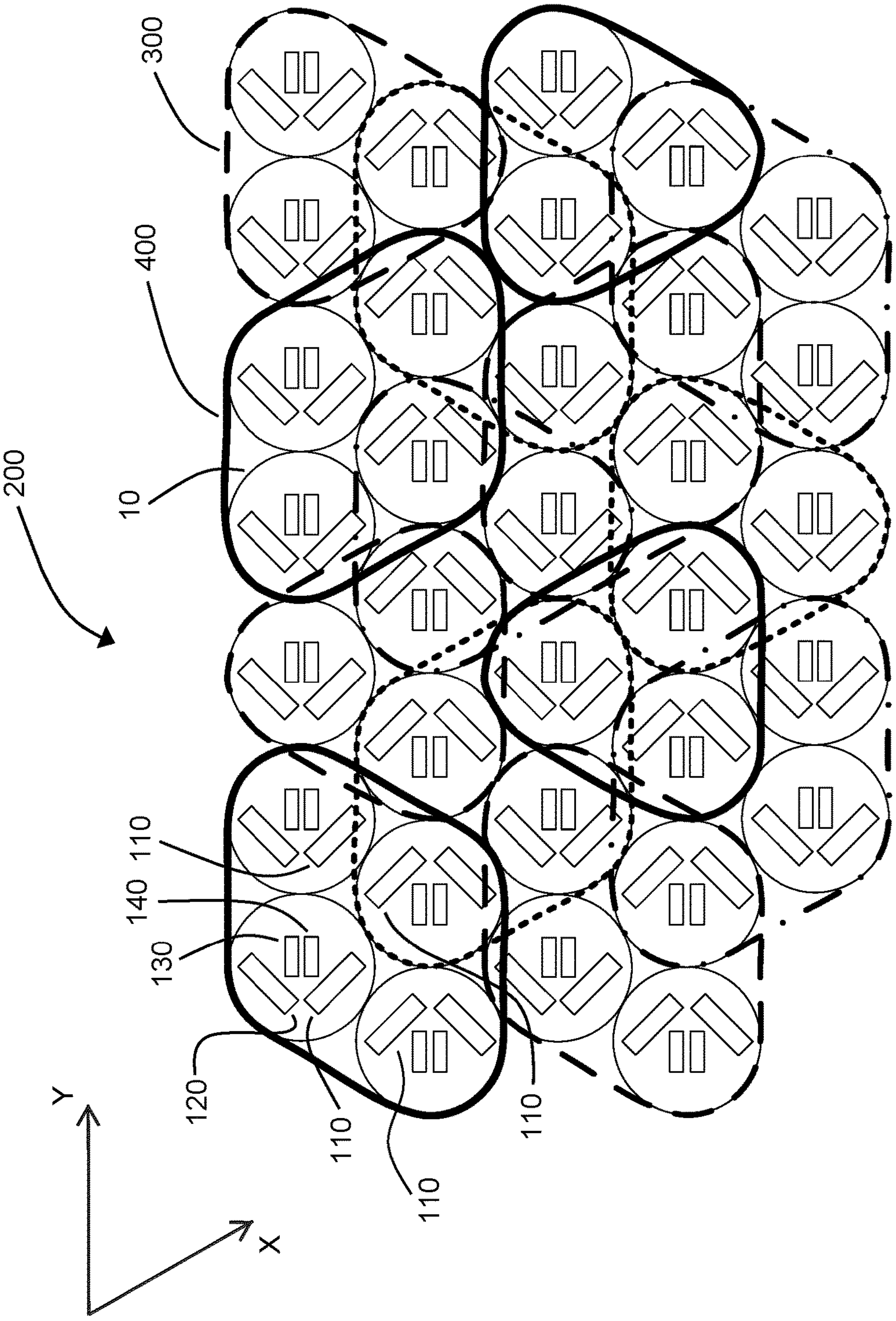
FIG. 5 shows an example of an irregular cluster layout where clusters comprise different numbers of feeds according to an embodiment of the present disclosure.

FIG. 5 shows a waveguide feed array 200 with a cluster layout according to an embodiment of the present disclosure wherein clusters 300, 400 comprise different numbers of feeds 10. The waveguide feed array 200 comprises multiple feeds 10 distributed in an equilateral triangular lattice with a spacing corresponding to one feed diameter. The number of feeds 10 in a cluster 300, 400 may vary between two and five, preferably three and four. The waveguide feed array 200 illustrated in FIG. 5 combines clusters 300, 400 comprising exactly three and four feeds 10 arranged in an irregular layout. Four different clusters 300, 400, marked with different line styles, are repeated in an irregular cluster lattice corresponding to a four-color scheme with frequency and polarization reuse.

In each frequency band, B1, B2, the spectrum is further divided into two sub-bands, F1, F2, combined with two orthogonal polarizations, P1, P2, to produce a four-color scheme. Clusters 300, 400 along a first direction X share at least one feed 10 and are offset with respect to each other along the first direction X, the offset varying from one cluster 300, 400 to another as also the size and orientation (at least as far as the shape of the cluster in terms of radiating elements of the feeds is concerned) of clusters 300, 400 vary along the first direction X. The shared feed 10 is advantageously rotated 180° around the main longitudinal direction Z, as well as the adjacent feed 10 of the same cluster 400 along the second direction Y in the case of a four-feed cluster 400, advantageously shared with a further adjacent cluster 300, 400 along a third direction in the plane defined by the main directions X, Y. Other rotation angles may provide similar benefits. Adjacent clusters 300, 400 along the first direction X with a shared feed 10 advantageously operate in orthogonal polarizations.

For example, in the lower frequency band B1, the first cluster 300, 400, marked with a thick solid line, may correspond to the pairing (F1, P1), while the adjacent cluster 300, 400, marked with a dotted line, may correspond to the pairing (F1, P2). In the upper frequency band B2, the polarizations may be inverted as usually implemented in communication satellite systems. The cluster layout alternates these two types of clusters 300, 400 along the first direction X, while also alternating the size and angular orientation around the main longitudinal direction Z (at least as far as the shape of the cluster in terms of radiating elements of the feeds is concerned) of the clusters 300, 400. The benefit of rotating feeds 10 around the longitudinal direction Z is particularly evident along the first direction X. This is illustrated with particular focus on the waveguide ports 110 of each feeds 10 of a cluster 400 marked with a thick solid line, which all operate in the same frequency band B1 and the same polarization P1.

All four waveguide ports 110 of a cluster 400 are next to each other, facilitating the design of the corresponding beamforming network. Clusters 300, 400 along a second direction Y have no feeds in common and are offset with respect to each other along the second direction Y, the offset varying from one cluster 300, 400 to another as also the size and angular orientation around the main longitudinal direction Z (at least as far as the shape of the cluster in terms of radiating elements of the feeds is concerned) of the clusters 300, 400 vary along the second direction Y. The angular orientation of the feeds 10 around the main longitudinal direction Z is invariant along the second direction Y. Adjacent clusters 300, 400 along the second direction Y with no feeds in common advantageously operate in the same polarization but in different frequency sub-bands.

For example, in the lower frequency band B1, the first cluster 300, 400, marked with a thick solid line, may correspond to the pairing (F1, P1), while the adjacent cluster 300, 400, marked with a dashed line, may correspond to the pairing (F2, P1). The four-color scheme is completed by a fourth type of cluster 300, 400, marked with a dash-dotted line, which may correspond to the pairing (F2, P2). With this cluster layout, polarization reuse is implemented along the first direction X, while frequency reuse is implemented along the second direction Y. The combination of clusters 300, 400 of different sizes may enable alternative cluster lattices with enhanced aggregate performance at antenna level compared to regular layouts with a moderate impact on design complexity.

For example, the specific layout in FIG. 5 requires only two types of beamforming network designs, one corresponding to a cluster 300 comprising exactly three feeds 10 and one corresponding to a cluster 400 comprising exactly four feeds 10. All beamforming networks may be obtained from these two designs through at least one of translation, rotation and/or symmetry along or around the main directions X, Y, Z. Beamforming networks of each cluster 300, 400 may be manufactured as separate units or group of adjacent units as their design may be such that beamforming networks of adjacent clusters 300, 400 do not overlap.

Figure 6A:
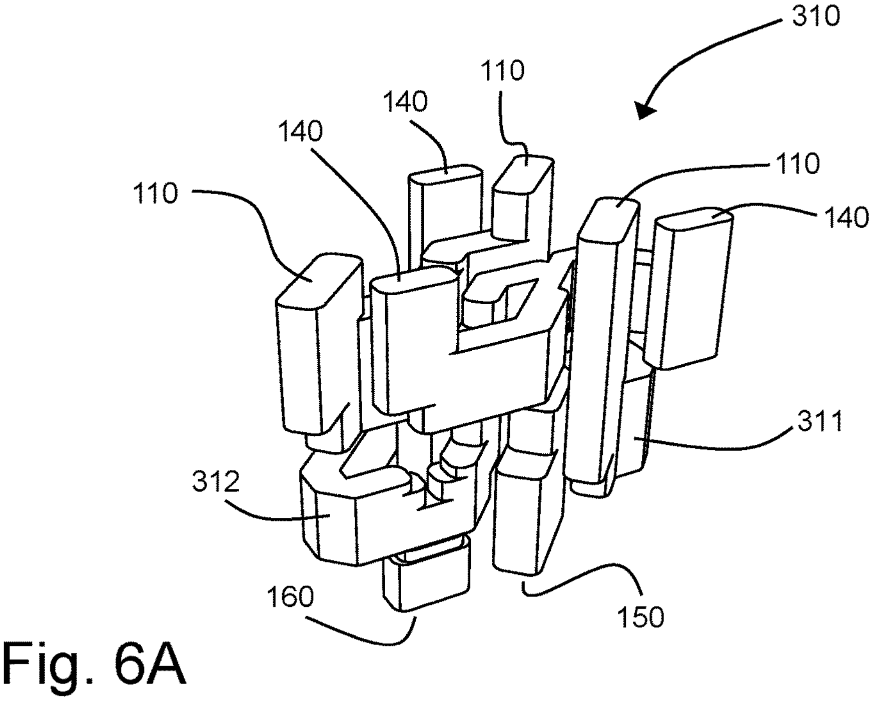
FIG. 6A shows an example of a beamforming network unit of a cluster comprising three feeds according to an embodiment of the present disclosure.

FIG. 6A shows an example of a beamforming network unit 310 according to an embodiment of the present disclosure using clusters 300 comprising three feeds 10. This representation illustrates the inner waveguide cavities to facilitate the visualization of the electromagnetic signal routing. The complete signal distribution is achieved in only two waveguide layers. The beamforming network unit 310 comprises two separate beamforming networks 311, 312 operating in different frequency bands B1, B2. The beamforming network 311 operating in the lower frequency band B1, with rectangular waveguides having a larger cross-section, may connect a common waveguide port 150 to three output waveguide ports 110, which may be further connected to corresponding waveguide ports 110 of the three feeds 10 of the cluster 300. Similarly, the beamforming network 312 operating in the higher frequency band B2, with rectangular waveguides having a smaller cross-section, may connect a common waveguide port 160 to three output waveguide ports 140, which may be further connected to corresponding waveguide ports 140 of the three feeds 10 of the cluster 300. The waveguide routing is such that the ports that are rotated with respect to the others around the main longitudinal direction Z are fed with a phase difference corresponding to the angle of rotation, for example, 180°. Further, the waveguide routing is such that all path lengths are substantially equal, resulting in broadband frequency response. The two beamforming networks 311, 312 are interleaved, producing a compact beamforming network unit 310.

Figure 6B:
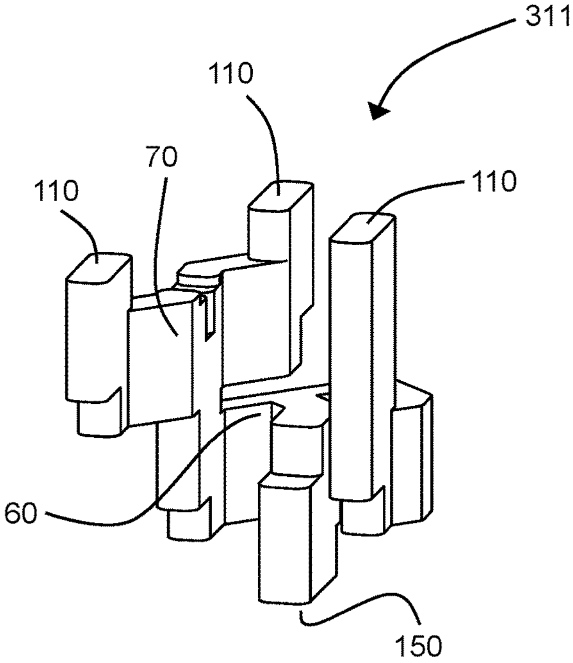
FIG. 6B shows an example of a beamforming network in a lower frequency band of a cluster comprising three feeds according to an embodiment of the present disclosure.
Figure 6C:
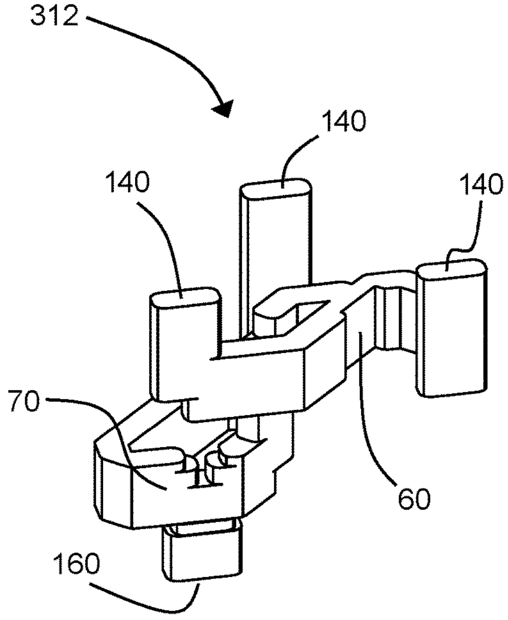
FIG. 6C shows an example of a beamforming network in a higher frequency band of a cluster comprising three feeds according to an embodiment of the present disclosure.

FIG. 6B and FIG. 6C show further details of the two beamforming networks 311, 312, respectively, of a beamforming network unit 310. The beamforming network 311 of FIG. 6B, operating in the lower frequency band B1, may correspond to a device in transmit in K/Ka-band onboard waveguide feed arrays 200. The electromagnetic signal applied to the common waveguide port 150 is first split by an E-plane T-junction 60 in a lower waveguide layer, which introduces a phase difference of 180° between the two output ports. One of these output ports is connected directly to a waveguide port 110 of a feed 10, while the signal on the other output port is further split by an H-plane T-junction 70 in the upper waveguide layer. The latter produces in-phase output signals, which may provide the adequate phase difference to the remaining two waveguide ports 110 of the cluster 300. The waveguide routing is such that all path lengths are substantially equal, resulting in broadband frequency response. The beamforming network 312 of FIG. 6C, operating in the higher frequency band B2, may correspond to a device in receive in K/Ka-band onboard feed arrays 200. The electromagnetic signal is received at all waveguide ports 140. Two waveguide ports 140 are combined in an upper waveguide layer through an E-plane T-junction 60, which introduces a phase difference of 180° between the two received signals. This combined signal is further summed to the signal received at the remaining waveguide port 140 through an H-plane T-junction 70 in the lower waveguide layer and directed to the common waveguide port 160. The waveguide routing is such that all path lengths are substantially equal, resulting in broadband frequency response.

Figure 7A:
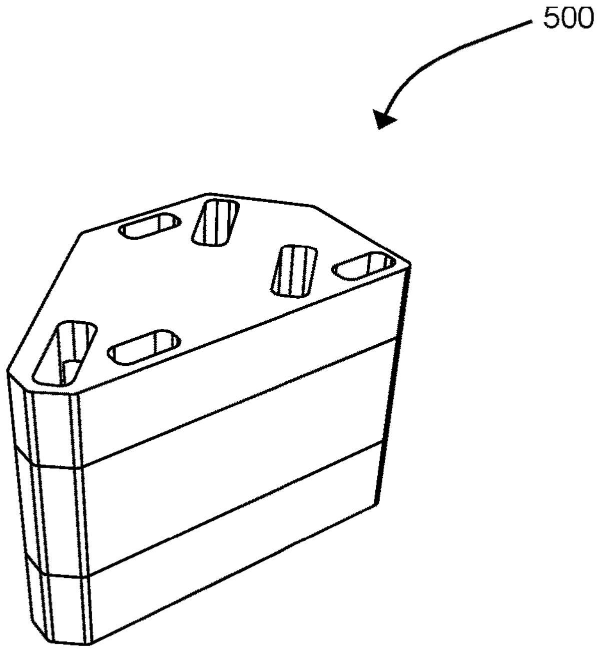
FIG. 7A shows an example of a 3D model of a multi-layer beamforming network unit of a cluster comprising three feeds according to an embodiment of the present disclosure.
Figure 7B:
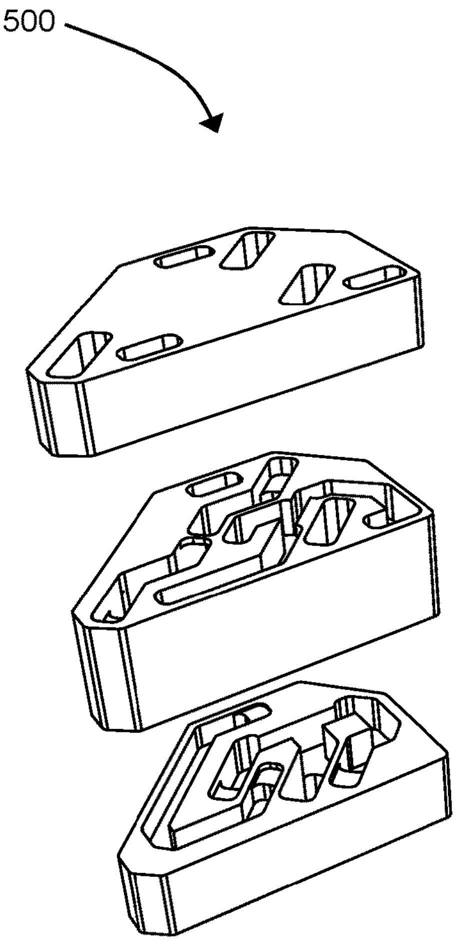
FIG. 7B shows an exploded view of an example of a 3D model of a multi-layer beamforming network unit of a cluster comprising three feeds according to an embodiment of the present disclosure.

FIG. 7A and FIG. 7B show 3D models of a multi-layer assembly of a beamforming network unit 500 of a cluster 300 comprising three feeds 10, representing the assembled and exploded views, respectively. Such a multi-layer mechanical design is generally implemented when manufacturing waveguide components using computer numerical control (CNC) milling techniques. The design of the two beamforming networks 311, 312, detailed in FIG. 6B and FIG. 6C, respectively, is such to enable a multi-layer assembly where the in-plane waveguide routing may be cut through the waveguide E-plane, corresponding to the plane cutting through the middle of the waveguide broad walls. This manufacturing technique known in the field is advantageous to reduce signal leakage, as this plane does not cut through electric currents, due to the symmetry of the current distribution in rectangular waveguides. Alternatively, the beamforming network unit 310 may be manufactured using other techniques such as diffusion bonding welding and additive layer manufacturing, mainly to reduce assembly complexity and weight.

Figure 8A:
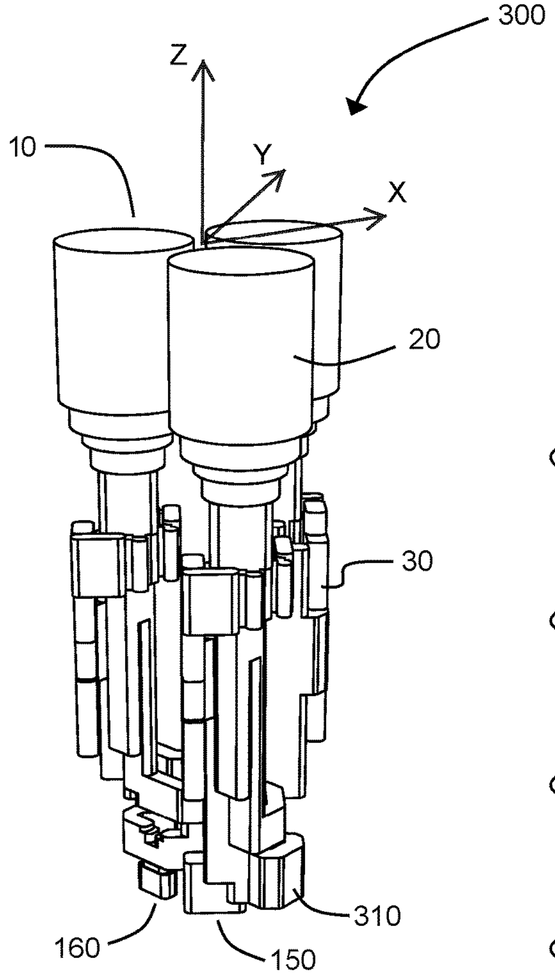
FIG. 8A shows an example of a complete cluster comprising three feeds according to an embodiment of the present disclosure.

FIG. 8A shows a 3D model of a cluster 300 comprising three feeds 10, each comprising a horn antenna 20 and an orthomode junction 30, and a beamforming network unit 310. This representation illustrates the inner waveguide cavities to facilitate the visualization of the electromagnetic signal routing. The three feeds 10 are connected through the beamforming network unit 310, with common waveguide ports 150, 160 for the lower frequency band B1 and higher frequency band B2, respectively. FIG. 8A also schematically shows the main longitudinal direction Z of the cluster 300 and the two main directions X, Y defining the aperture of the cluster, substantially orthogonal to the main longitudinal direction Z.

Figure 8B:
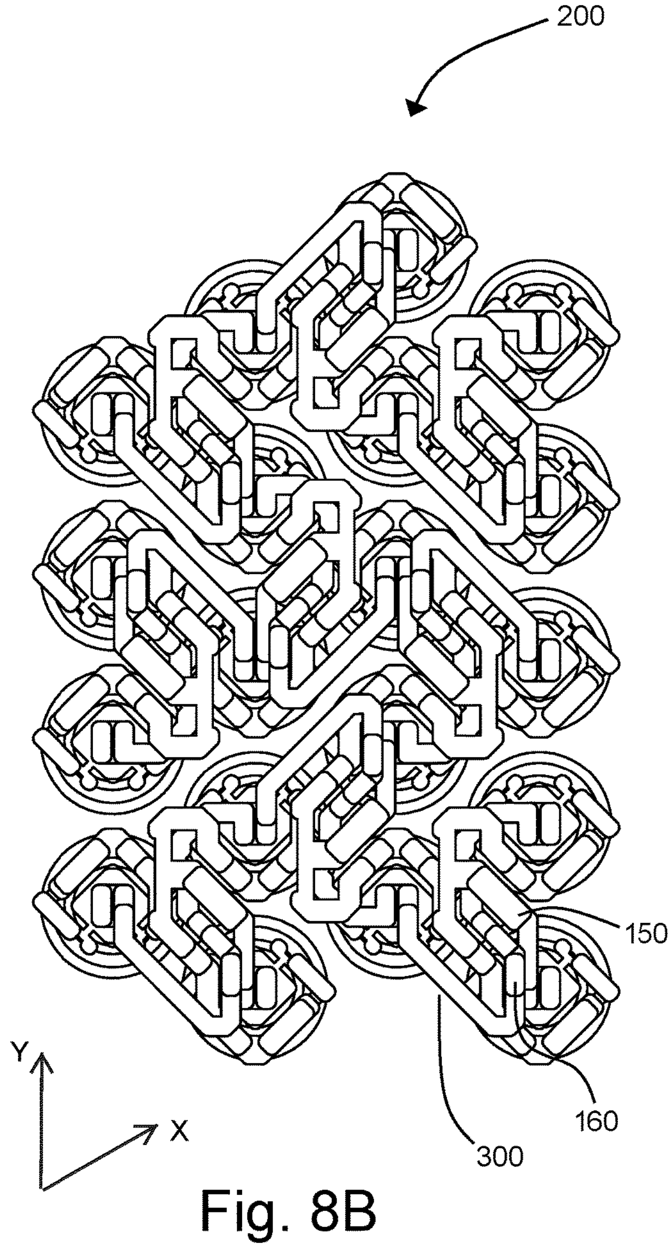
FIG. 8B shows an example of a complete waveguide feed array comprising clusters of three feeds according to an embodiment of the present disclosure.

FIG. 8B shows a 3D model of a waveguide feed array 200 comprising 9 clusters 300 of three feeds 10 each. This view from the beamforming network 310 side highlights the main benefits of the present disclosure as all beamforming networks 310 are identical and related to each other by at least one of translation, rotation and/or symmetry along or around the main directions X, Y, Z. Furthermore, the beamforming network units 310 of each cluster 300 do not overlap and may be manufactured as separate units or groups of adjacent units, for example, as lines of beamforming network units 310 along the second direction Y. The particular arrangement illustrated in FIG. 8B corresponds to the cluster layout of FIG. 3B.

Figure 9A:
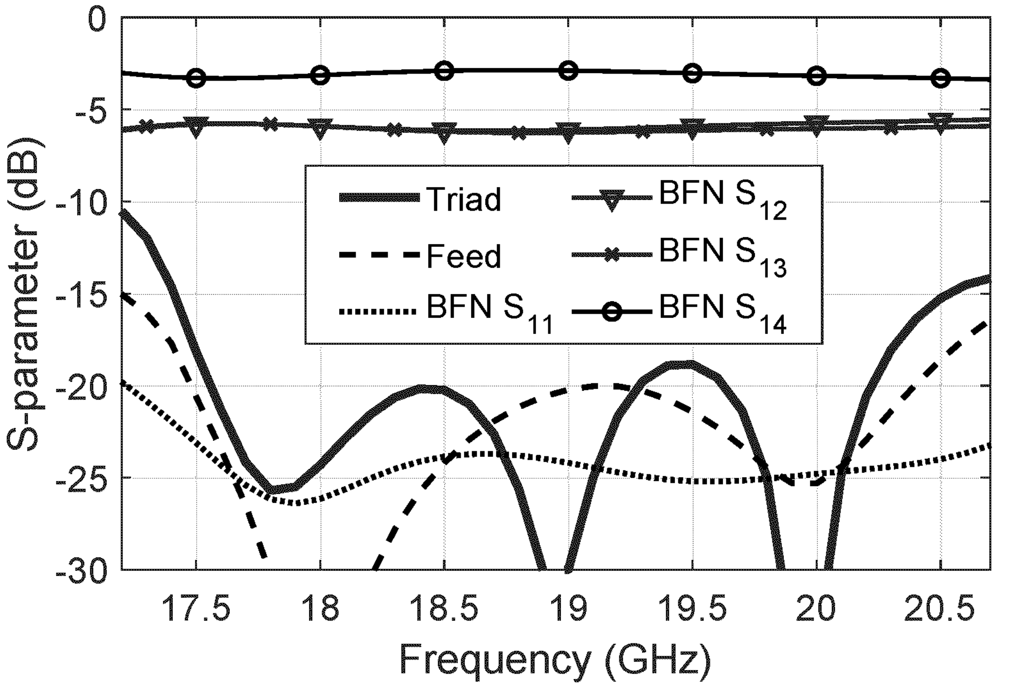
FIG. 9A and FIG. 9B show scattering parameters of an example of a complete cluster comprising three feeds according to an embodiment of the present disclosure.
Figure 9B:
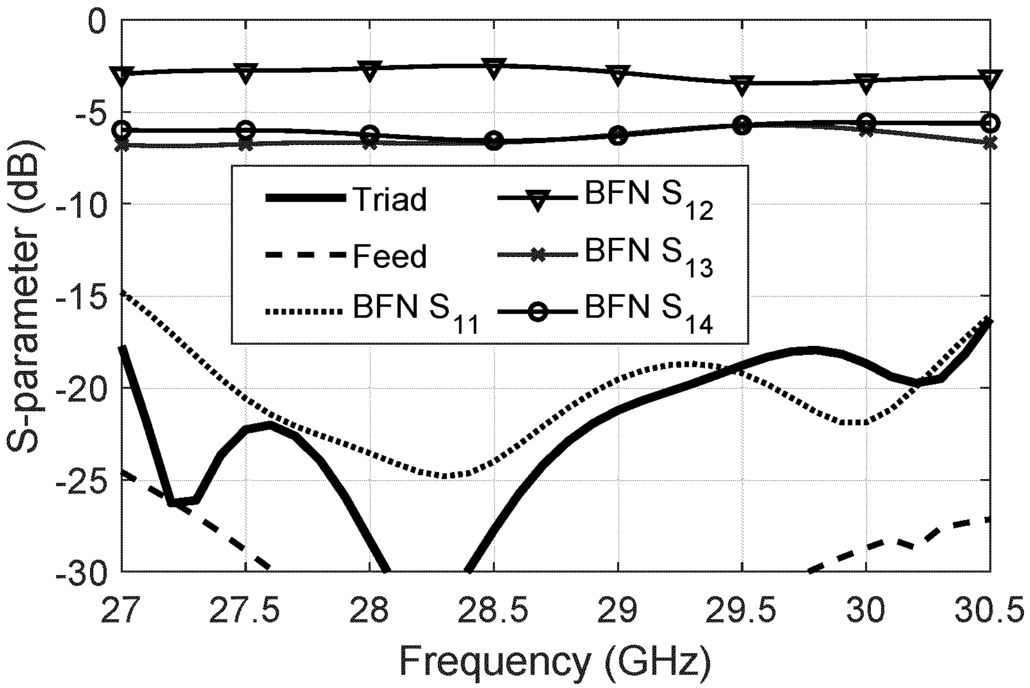

FIG. 9A and FIG. 9B provide numerical results of a full-wave model of a cluster 300, in the lower frequency band B1 and in the higher frequency band B2, respectively. The results correspond to the 3D model illustrated in FIG. 8A, according to an embodiment of the present disclosure. Specifically, the numerical results correspond to scattering parameters, or S-parameters. In particular, the reflection coefficients at the common port in both bands correspond to the thick solid lines, labelled "Triad" in the legend, while the dashed lines correspond to the reflection coefficients of the feed 10 alone and the dotted lines correspond to the reflection coefficients of the beamforming network 310 (BFN) alone, labelled "BFN S11." The transmission coefficients from the common waveguide port 150, 160 to the feed ports 110, 140 of both beamforming networks 311, 312 are also provided with marked lines, labelled "BFN Sin" with n=1 . . . 3.

It can be seen that the feed 10 and beamforming networks 311, 312 have a broadband response as separate units. The broadband response is preserved when the separate units are combined and the reflection coefficients of the cluster 300 remain better than −18 dB both in the down-link (17.7-20.2 GHZ) and the up-link (27.5-30 GHz) frequency bands typically allocated to broadband communication satellites. The transmission coefficients demonstrate a stable response over frequency. The design presented here makes use of E-plane and H-plane T-junctions with balanced output power. Thus, one port has theoretically a transmission coefficient of −3.01 dB, while the other two have a transmission coefficient of −6.02 dB. The values obtained with the full-wave model are in line with expectations.

For example, the coefficients $S_{12}$ and $S_{13}$ are approximately equal to −6 dB over the complete analyzed frequency band in FIG. 9A, corresponding to the lower frequency band B1, while the remaining coefficient $S_{14}$ is around −3 dB. To facilitate the waveguide routing, the coefficient $S_{12}$ is around −3 dB in FIG. 9B, corresponding to the higher frequency band B2, while the remaining two coefficients, $S_{13}$ and $S_{14}$, vary around −6 dB. The use of balanced T-junctions simplifies the beamforming network design while having limited impact at antenna level compared to a cluster 300 with all feeds 10 equally fed, corresponding to a transmission coefficient to all waveguide ports of −4.77 dB.

Figure 10A:
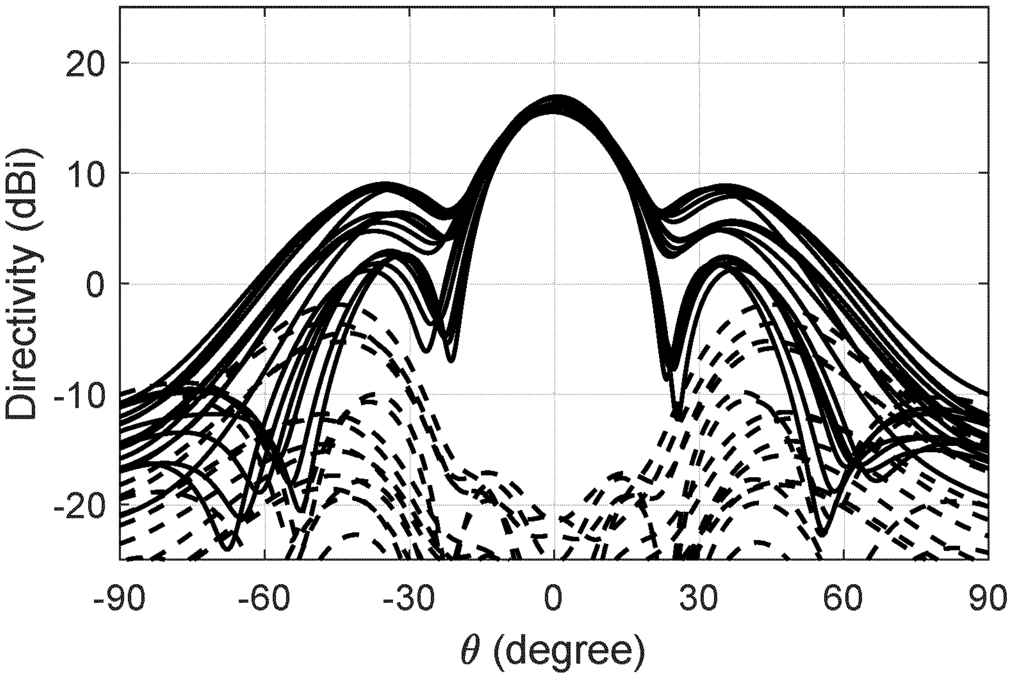
FIG. 10A and FIG. 10B show radiation patterns of an example of a complete cluster comprising three feeds according to an embodiment of the present disclosure.
Figure 10B:
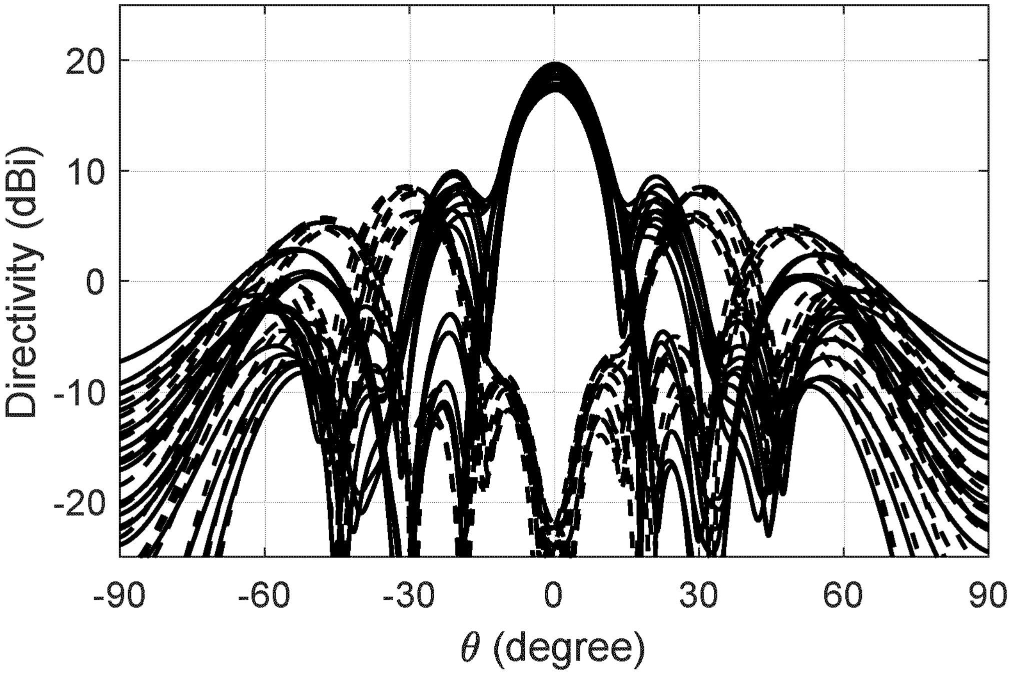

FIG. 10A and FIG. 10B provide numerical results of a full-wave model of a cluster 300, in the lower frequency band B1 and the upper frequency band B2, respectively. The results correspond to the 3D model reported in FIG. 8A, according to an embodiment of the present disclosure. Specifically, the results correspond to radiation patterns at cluster level. The co-polarized radiated field component (e.g., LHCP) is reported with solid lines while the cross-polarized radiated field component (e.g., RHCP) is reported in dashed lines. The radiated field is evaluated in spherical coordinates (θ, φ) with the main longitudinal direction Z corresponding to the angular direction θ=0°. Numerical results are provided as a function of the angle θ and overlaid for φ=0°, φ=45° and φ=90° and with steps of 500 MHz over the down-link (17.7-20.2 GHz) and the up-link (27.5-30 GHz) frequency bands typically allocated to broadband communication satellites. The contribution of the beamforming networks 311, 312 to the cross-polarization can be evaluated on-axis, i.e., for θ=0°, as the symmetric design of the stepped horn antenna 20 produce no cross-polarized electric field in that angular direction. The cross-polarization discrimination, corresponding to the ratio of the co-polarized to the cross-polarized electric field components, is better than 35 dB on-axis, in line with the performance of the orthomode junction 30 and confirming that the particular arrangement of the feeds 10 with different angular orientation around the main longitudinal direction Z does not affect the radiation patterns.

Figure 11A:
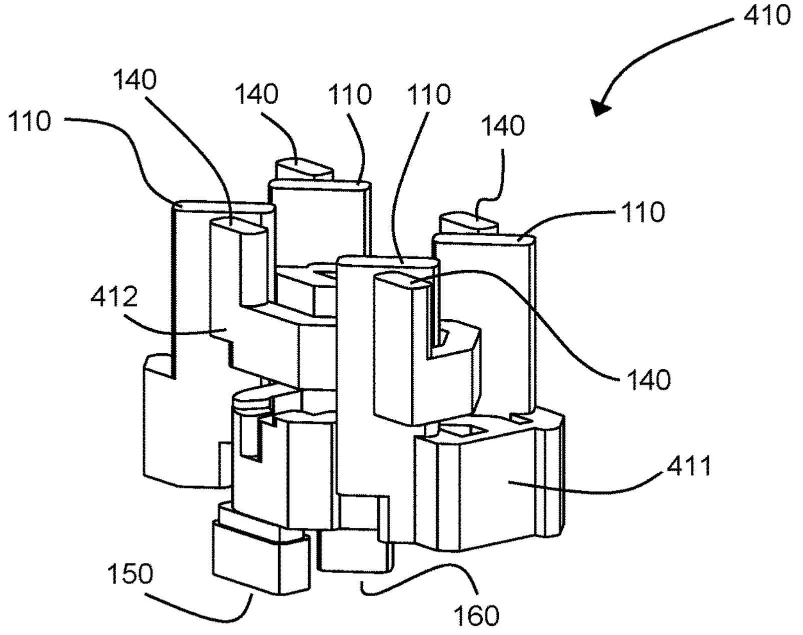
FIG. 11A shows an example of a beamforming network unit of a cluster comprising four feeds according to an embodiment of the present disclosure.

FIG. 11A shows an example of a beamforming network unit 410 according to an embodiment of the present disclosure using clusters 400 comprising four feeds 10. This representation illustrates the inner waveguide cavities to facilitate the visualization of the electromagnetic signal routing. The complete signal distribution is achieved in only two waveguide layers. The beamforming network unit 410 comprises two separate beamforming networks 411, 412 operating in different frequency bands B1, B2. The beamforming network 411 operating in the lower frequency band B1, with rectangular waveguides having a larger cross-section, may connect a common waveguide port 150 to three output waveguide ports 110, which may be further connected to corresponding waveguide ports 110 of the four feeds 10 of the cluster 400.

Similarly, the beamforming network 412 operating in the higher frequency band B2, with rectangular waveguides having a smaller cross-section, may connect a common waveguide port 160 to four output waveguide ports 140, which may be further connected to corresponding waveguide ports 140 of the four feeds 10 of the cluster 400. The waveguide routing is such that the ports that are rotated with respect to the others around the main longitudinal direction Z are fed with a phase difference corresponding to the angle of rotation, for example, 180°. Further, the waveguide routing is such that all path lengths are substantially equal, resulting in broadband frequency response. The two beamforming networks 411, 412 are interleaved, producing a compact beamforming network unit 410.

Figure 11B:
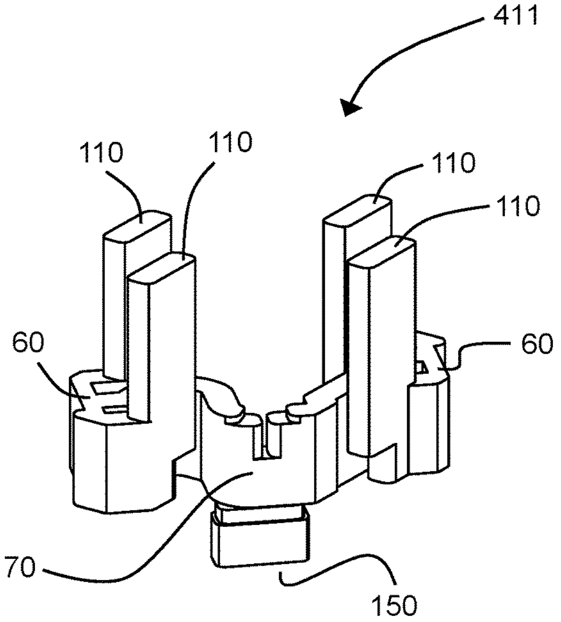
FIG. 11B shows an example of a beamforming network in a lower frequency band of a cluster comprising four feeds according to an embodiment of the present disclosure.
Figure 11C:
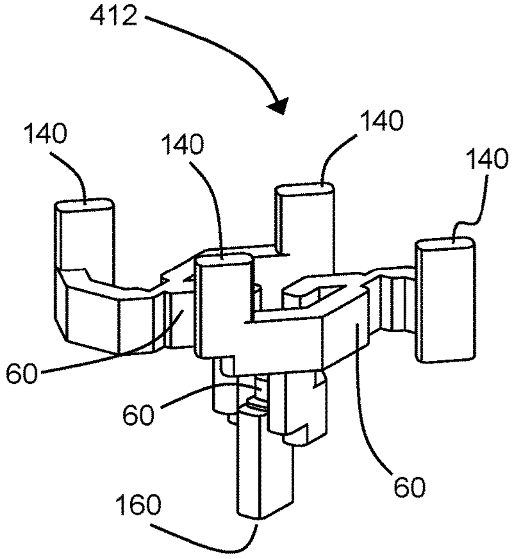
FIG. 11C shows an example of a beamforming network in a higher frequency band of a cluster comprising four feeds according to an embodiment of the present disclosure.

FIG. 11B and FIG. 11C show further details of the two beamforming networks 411, 412, respectively, of a beamforming network unit 410. The beamforming network 411 of FIG. 11B, operating in the lower frequency band B1, may correspond to a device in transmit in K/Ka-band onboard waveguide feed arrays 200. The electromagnetic signal applied to the common waveguide port 150 is first split by an H-plane T-junction 70 in a lower waveguide layer, which provides in-phase output signals. These two output signals are further split by two E-plane T-junctions 60 in the same waveguide layer, introducing the adequate out-of-phase condition. These E-plane T-junctions 60 are asymmetric to produce an amplitude taper, as this is found to improve performance at antenna level in this particular case.

The waveguide routing is such that all path lengths are substantially equal, resulting in broadband frequency response. The beamforming network 412 of FIG. 11C, operating in the higher frequency band B2, may correspond to a device in receive in K/Ka-band onboard waveguide feed arrays 200. The electromagnetic signal is received at all feed ports 140. Waveguide ports 140 are combined by pairs in an upper waveguide layer through an E-plane T-junction 60, which introduces a phase difference of 180° between the two received signals. These E-plane T-junctions 60 are also asymmetric to introduce an amplitude taper. The combined electromagnetic signals are further summed through a balanced E-plane T-junction 60 in the lower waveguide layer and directed to the common waveguide port 160. The waveguide routing is such that all path lengths are substantially equal, resulting in broadband frequency response.

Figure 12A:
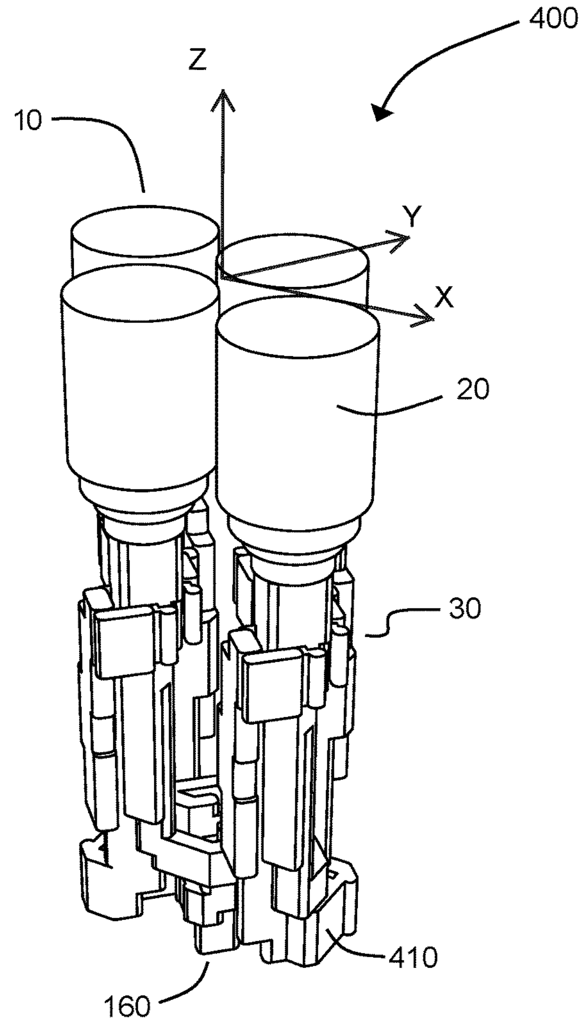
FIG. 12A shows an example of a complete cluster comprising four feeds according to an embodiment of the present disclosure.

FIG. 12A shows a 3D model of a cluster 400 comprising four feeds 10, each comprising a stepped horn antenna 20 and an orthomode junction 30, and a beamforming network unit 410. This representation illustrates the inner waveguide cavities to facilitate the visualization of the electromagnetic signal routing. The four feeds 10 are connected through the beamforming network unit 410, with common ports 150, 160 for the lower frequency band B1 and higher frequency band B2, respectively (the waveguide port 150 is not visible in this perspective view). FIG. 12A also schematically shows the main longitudinal direction Z of the cluster 400 and the two main directions X, Y defining the aperture of the cluster, substantially orthogonal to the main longitudinal direction Z.

Figure 12B:
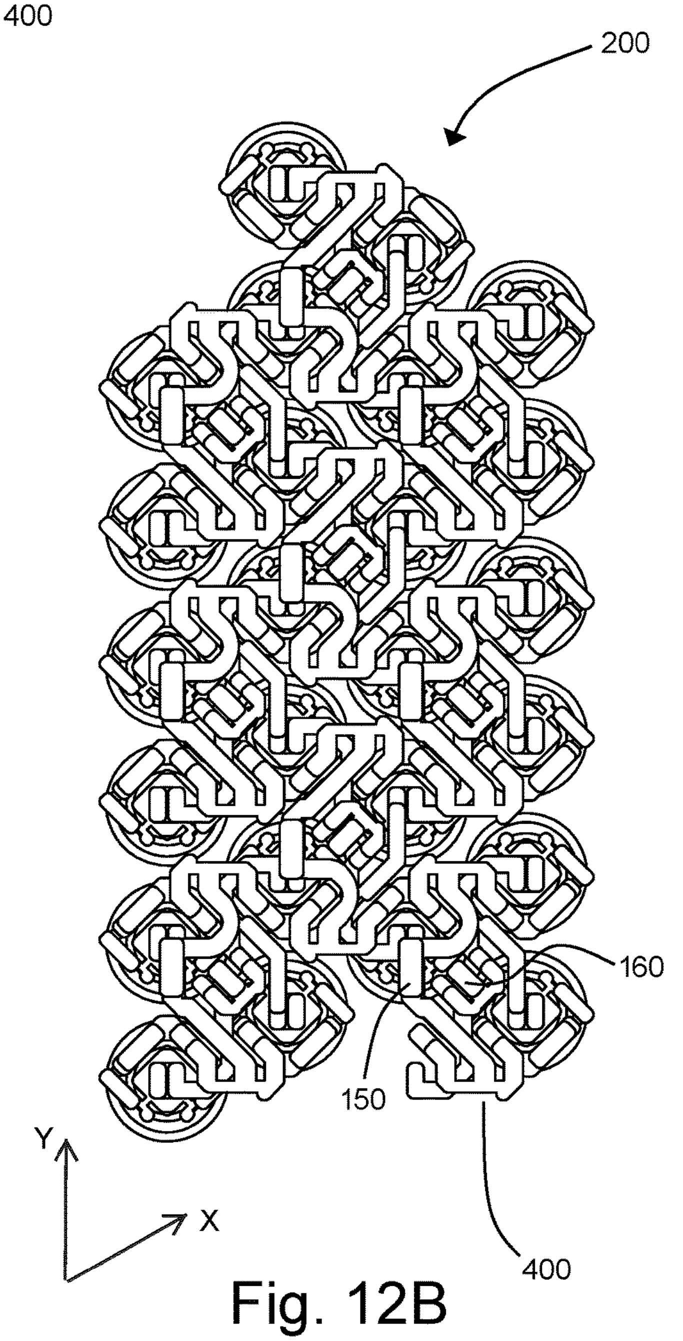
FIG. 12B shows an example of a complete waveguide feed array comprising clusters of four feeds according to an embodiment of the present disclosure.

FIG. 12B shows a 3D model of a feed array 200 comprising nine clusters 400 of four feeds 10 each. This view from the beamforming network 410 side highlights the main benefits of the present disclosure as all beamforming networks 410 are identical and related to each other by at least one of translation, rotation and/or symmetry along or around the main directions X, Y, Z. Furthermore, the beamforming network units 410 do not overlap and may be manufactured as separate units or groups of adjacent units, for example, as lines of beamforming network units 410 along the second direction Y.

Antenna System

Figure 13:
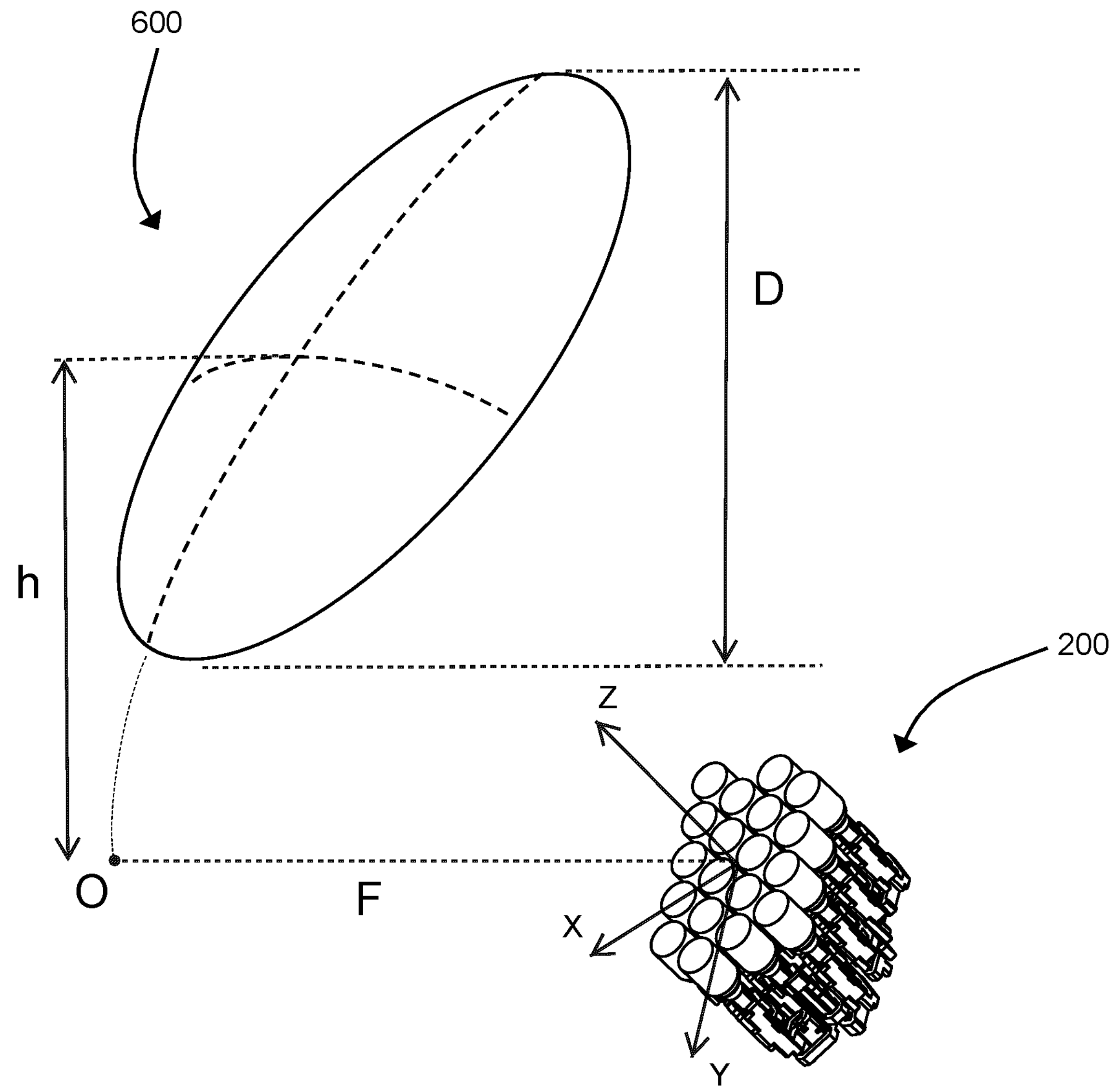
FIG. 13 schematically represents an antenna system comprising a reflector and a waveguide feed array according to an embodiment of the present disclosure.

FIG. 13 schematically represents a reflector antenna 600 for use in combination with the waveguide feed array 200. The reflector geometry is typically defined by a surface of revolution around the focal axis F. Preferably, the surface of revolution is a paraboloid with apex O. The projected aperture along the focal direction is a disk with diameter D, offset by h with reference to the focal axis F. The waveguide feed array 200 is located at the focal point of the paraboloid geometry with its main longitudinal direction Z pointing approximately towards the center of the reflector 600. Specifically, a reflector geometry with a focal length of 3 m, a projected aperture diameter of 1.6 m and an offset of 1.4 m is considered for a design in the K/Ka-band. This geometry has been optimized for the reference cluster layout as illustrated in the FIG. 4A. The waveguide feed array 200 is composed of circular feeds 10 distributed in an equilateral triangular lattice with an inter-element spacing of 25 mm, corresponding to the outer diameter of the feeds 10. For comparison purposes, all analyzed cluster layouts use the same reflector geometry. Considering the stable response over frequency of the proposed cluster 300, 400 designs, as demonstrated by the numerical results reported in FIG. 9A to FIG. 10B, analyses at antenna level are carried out only at 20 GHz and 30 GHz.

FIG. 14A to FIG. 14D provide contour plots in uv coordinates, such that $u=\sin\theta\cos\varphi$ and $v=\sin\theta\sin\varphi$ with reference to the spherical coordinates $(\theta, \varphi)$, for a number of multiple beam coverage produced by antenna systems comprising a waveguide feed array 200 according to an embodiment of the present disclosure. The contour plots are reported at 30 GHz, as the highest frequency is generally the worst case in terms of overlapping between adjacent beams. The contours report far-field values 3 and 6 dB below the peak directivity of each beam, expressed in dBi. The number of beams is set to cover an arbitrary service area with u and v coordinates ranging both from −0.025 to 0.025, corresponding to an angular range of about 3° in θ suitable for a regional coverage such as Western Europe from geostationary orbit.

Figure 14A:
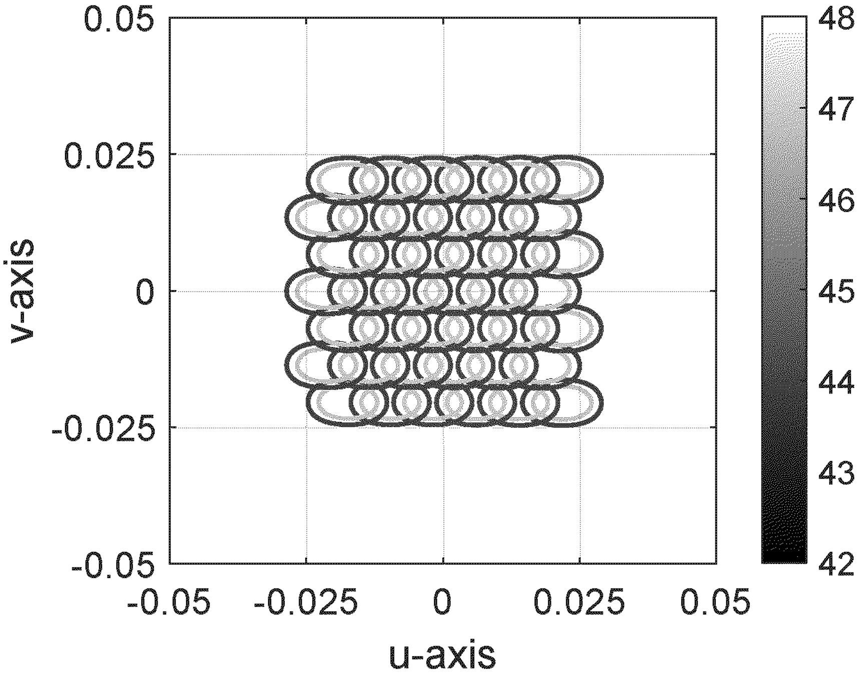
FIG. 14A to FIG. 14D show directivity contour plots of different antenna configurations according to embodiments of the present disclosure.

Specifically, FIG. 14A illustrates the multiple beam coverage produced by a waveguide feed array 200 using clusters of two feeds 10 each. The beams show stronger overlap along a first direction X' along the u-axis, corresponding to the first direction X of the waveguide feed array 200 along which adjacent clusters share one feed 10. Along the second direction Y', approximately at 60° with respect to the u-axis, the contour plots do not overlap, corresponding to the second direction Y of the waveguide feed array 200 along which adjacent clusters have no feeds in common.

Figure 14B:
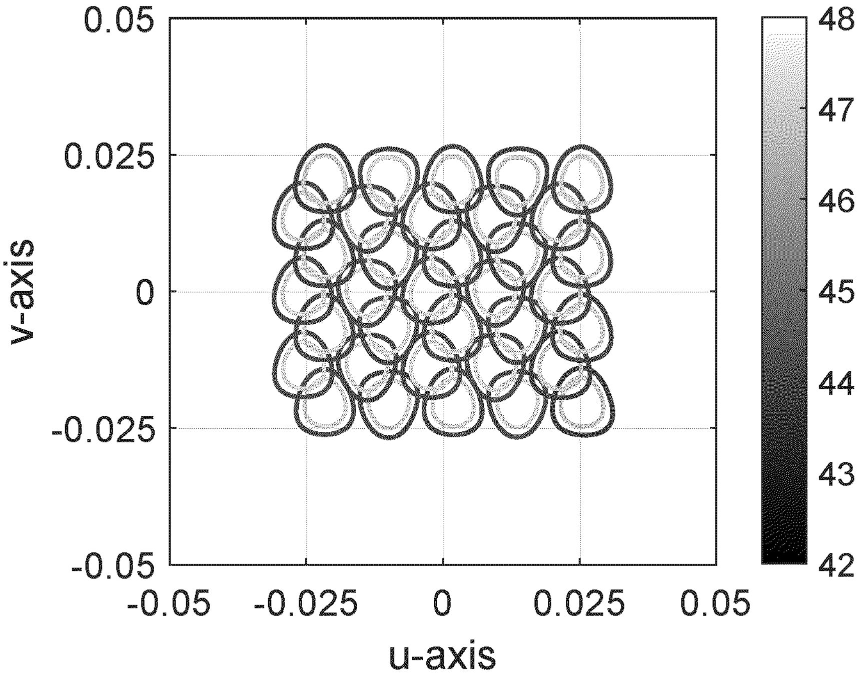

FIG. 14B illustrates the multiple beam coverage produced by a waveguide feed array 200 using clusters 300 of three feeds 10 each. The cluster layout corresponds to the one shown in FIG. 3B with an irregular lattice of clusters 300, resulting in a lattice of beams approximately square. In this representation, the second direction Y' is along the u-axis, as contour plots do not overlap along that direction, corresponding to the second direction Y of the waveguide feed array 200 along which adjacent clusters 300 have no feeds in common. Along a first direction X', approximately at 45° with respect to the u-axis, the irregular layout results in contours alternatively overlapping and not overlapping, corresponding to the first direction X of the waveguide feed array 200.

Figure 14C:
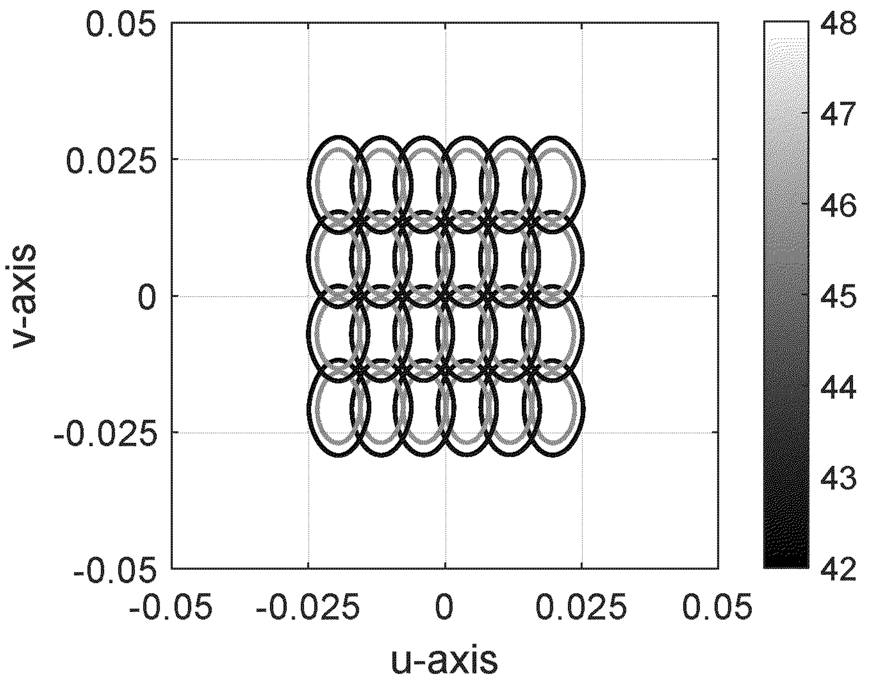

FIG. 14C shows a multiple beam coverage produced by a feed array 200 using clusters 400 of four feeds 10 each. The cluster layout corresponds to the one illustrated in FIG. 4A, producing a beam lattice essentially rectangular with an aspect ratio equal to $\sqrt{3}$. In this representation, the first direction X' is set along the u-axis and contour plots are seen to overlap along that direction. The first direction X' corresponds to the first direction X of the waveguide feed array 200 along which adjacent clusters 400 share one feed 10. Along a second direction Y', approximately at 60° with respect to the u-axis, the contour plots do not overlap, as this corresponds to the second direction Y of the feed array 200 along which adjacent clusters 400 have no feeds in common.

Figure 14D:
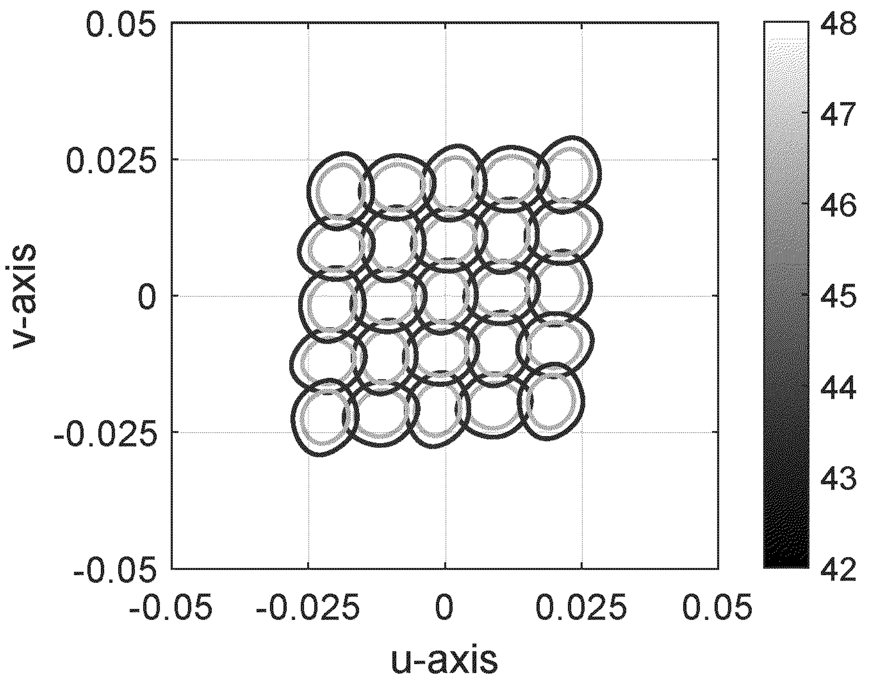

Finally, FIG. 14D shows a multiple beam coverage produced by a waveguide feed array 200 using clusters 400 of four feeds 10 each. The cluster layout corresponds to the one illustrated in FIG. 4B, producing a beam lattice approximately square. In this representation, the first direction X' is also set along the u-axis and contour plots overlap along that direction, corresponding to the first direction X of the waveguide feed array 200 along which adjacent clusters 400 share one feed 10. The second direction Y', approximately at 45° with respect to the u-axis corresponds to the second direction Y of the waveguide feed array 200 along which adjacent clusters 400 have no feeds in common.

It is noted that the contour plots of each beam differ from those in FIG. 14C although both configurations use identical clusters 400 of four feeds 10. This is because the results in FIG. 14C implement no amplitude taper at cluster level and all feeds 10 have the same coefficients, specifically −6.02 dB, while the results in FIG. 14D make use of an amplitude taper with most distant feeds 10 of the cluster 400 having less power than the remaining two feeds 10. This difference in amplitude coefficients results in elliptical beams in the case reported in FIG. 14C and more circular beams in the case reported in FIG. 14D. Both waveguide feed arrays 200 are optimum for their respective lattice, for a fair comparison. The amplitude taper required in FIG. 14D is implemented using unbalanced T-junctions with limited impact on other parameters such as insertion phase.

For the results reported in FIG. 14B, an amplitude taper was also implemented, as evidenced by the numerical results reported in FIG. 9A and FIG. 9B. In this particular case, the amplitude taper was found to have limited impact on antenna performance, so balanced T-junctions were implemented to simplify the design, resulting in the amplitude excitation triplet −3.01 dB, −6.02 dB, −6.02 dB. These contour plots highlight a first benefit of the present disclosure at antenna level. Assuming the same reflector geometry, a waveguide feed array 200 with a cluster layout using clusters 300 comprising three feeds 10 each may cover the given service area with 35 beams, while a feed array 200 with clusters 400 comprising four feeds 10 each covers the same solid angle with only 24 beams. This corresponds to an increase in the number of beams of about 50%, resulting in higher throughput density over the service area, with waveguide feed arrays 200 that have essentially the same size and very similar complexity. Further increase in beam density is evidenced with the configuration illustrated in FIG. 14A, where 42 beams may be generated over the given service area using clusters comprising two feeds 10 each, corresponding to a further increase of about 20% with a very similar feed array size.

FIG. 15A to FIG. 15D show comparative metrics of antenna systems using various waveguide feed array 200 designs according to embodiments of the present disclosure. The configuration with four feeds per beam and represented with thick solid lines corresponds to the numerical results in FIG. 14C. The configuration with three feeds per beam and represented with dashed lines corresponds to the numerical results in FIG. 14B. The configuration with two feeds per beam and represented with dotted lines corresponds to the numerical results in FIG. 14A. Finally, the configuration with four feeds in an irregular cluster lattice and represented with thin solid lines corresponds to the numerical results in FIG. 14D.

Figure 15A:
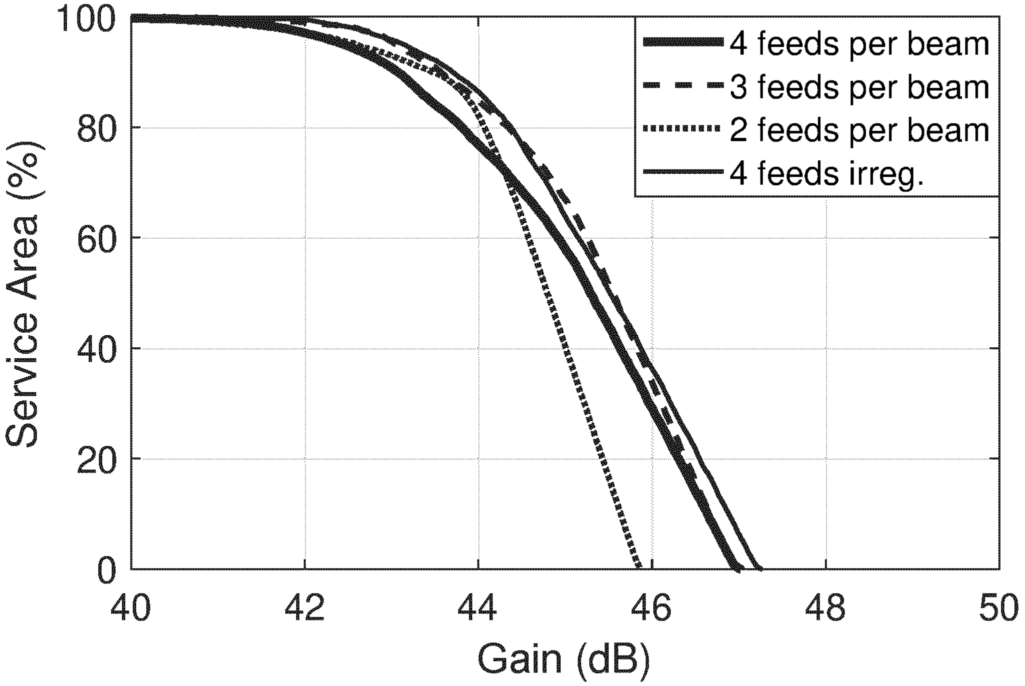
FIG. 15A and FIG. 15B compare the aggregate gain distribution over the service area of different antenna configurations according to embodiments of the d present disclosure.
Figure 15B:
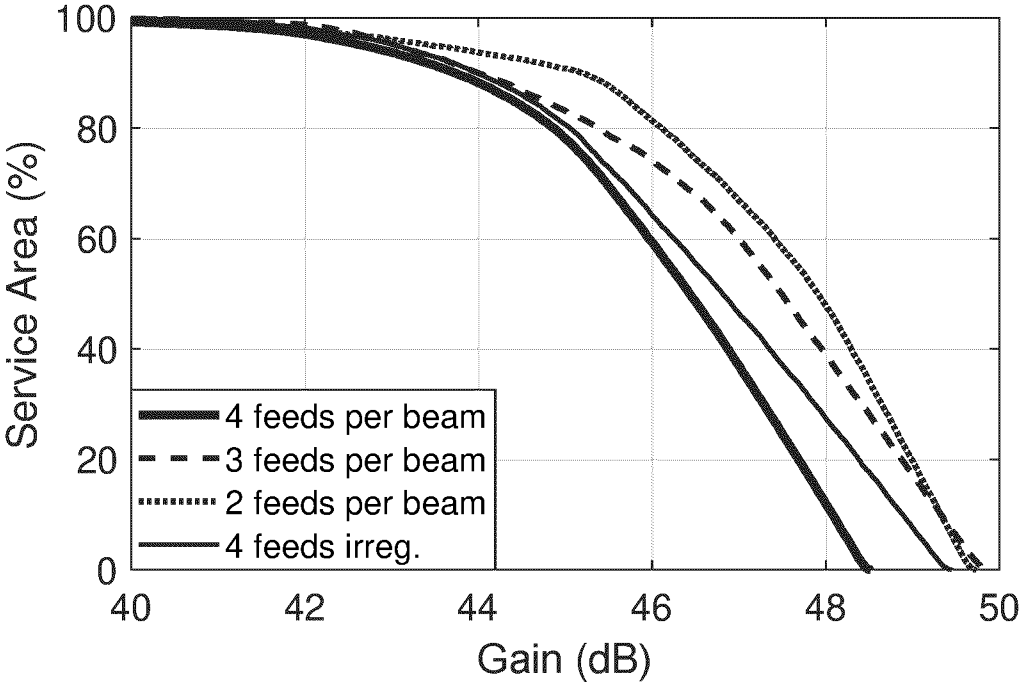
Figure 15C:
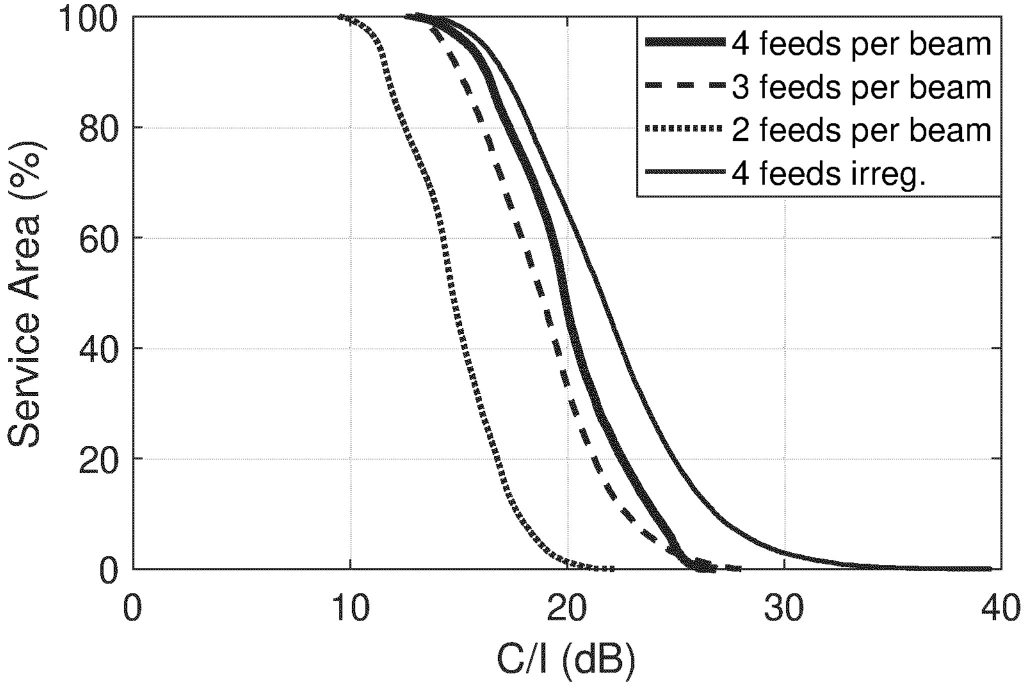
FIG. 15C and FIG. 15D compare the C/I distribution over the service area of different antenna configurations according to embodiments of the present disclosure.
Figure 15D:
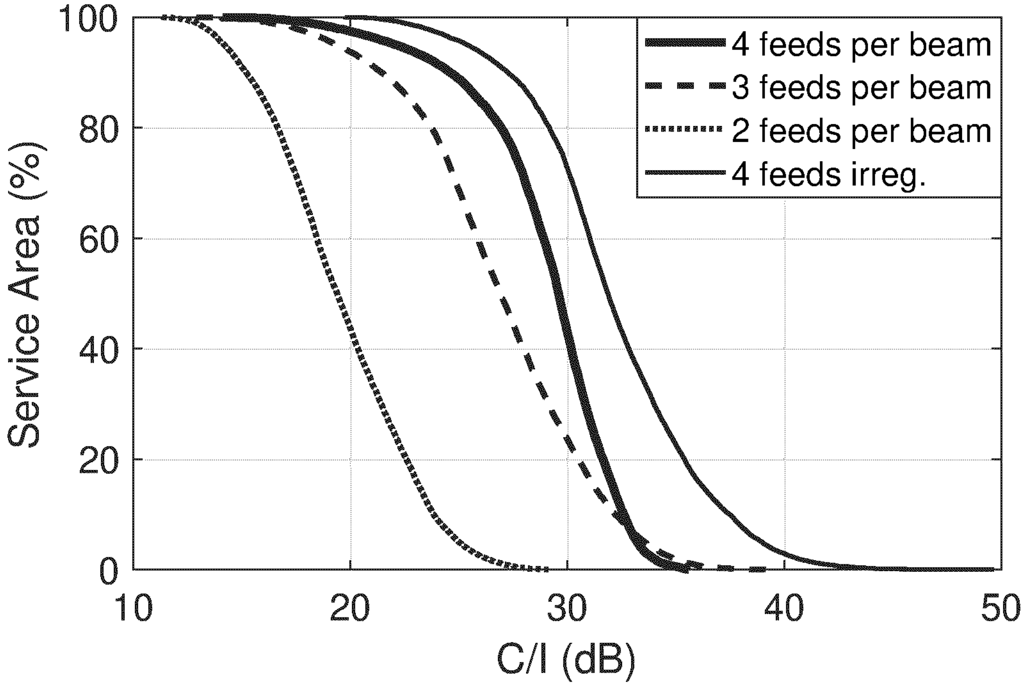

Specifically, FIG. 15A and FIG. 15B show aggregate gain distribution over the service area at 20 GHz and 30 GHz, respectively. The representation indicates the percentage of service area on the y-axis having a gain equal or greater to the corresponding value on the x-axis. FIG. 15C and FIG. 15D show aggregate C/I distribution over the service area at 20 GHz and 30 GHz, respectively. The representation indicates the percentage of service area on the y-axis having a C/I equal or greater to the corresponding value on the x-axis. The first conclusion is that the irregular lattice of clusters 400 comprising four feeds 10, enabled by the present disclosure, improves over existing solutions both in aggregate gain and C/I. This indicates that higher antenna system performance is achievable while maintaining the same waveguide feed array 200 complexity and size. It is anticipated that alternative cluster lattices, taking advantage of the greater freedom enabled with the present disclosure, may improve further antenna system metrics, with a joint optimization of the waveguide feed array 200 and reflector 600.

Another important remark is that the design using three feeds per beam provides competitive antenna system performance. While the aggregate gain is slightly better than the reference cluster layout, the C/I is slightly worse, indicating that with adequate optimization of the overall geometry, comparable performance could be achieved while increasing the number of beams by approximately 50%. This is an important result as UHTS systems in particular aim at higher throughput density over the service area for national or regional broadband services. This configuration with three feeds per beam seems to be an optimum between antenna performance and beam density, as evidenced by the numerical results obtained with the design having two feeds per beam. The C/I is found to suffer particularly in that case, as well as aggregate gain in the lower frequency band due to higher spillover losses. However, it is clear that the antenna geometry is sub-optimal in that case and better results may be obtained adjusting the reflector parameters accordingly. In particular, with these clusters having a high aspect ratio of 2, an elliptical reflector may be preferable. Further improvement may also be achieved combining clusters of different sizes, as illustrated in FIG. 5.

It should be noted that the above-mentioned embodiments illustrate rather than limit the present disclosure, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or stages other than those stated in a claim. The article "a" or "an" preceding an element does not exclude the presence of a plurality of such elements. Expressions such as "at least one of" when preceding a list or group of elements represent a selection of all or of any subset of elements from the list or group. For example, the expression, "at least one of A, B, and C" should be understood as including only A, only B, only C, both A and B, both A and C, both B and C, or all of A, B, and C. The present disclosure may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A waveguide feed array, comprising:

overlapping clusters of elementary feeds, each feed configured to operate in at least two distinct frequency bands with dual-polarization in each frequency band, wherein the feeds have at least four waveguide ports each, one waveguide port for each pairing of frequency band and polarization, and are connected through beamforming networks, one beamforming network per frequency band, and wherein the clusters of elementary feeds each have at least two beamforming networks and at least two common ports, the waveguide feed array further having a main longitudinal direction that is substantially orthogonal to a plane of an aperture of the waveguide feed array, the plane being defined by two main directions, wherein:

adjacent clusters along a first direction of the two main directions are configured to operate, for a given frequency band, in different polarizations; and at least one feed of each cluster is rotated around the main longitudinal direction with reference to the other feeds of said cluster.

2. The waveguide feed array according to claim 1, wherein at least one feed of each cluster is rotated by 180° around the main longitudinal direction (Z) with reference to the other feeds of said cluster.

3. The waveguide feed array according to claim 1, wherein at least one pair of adjacent clusters along the first direction of the two main directions shares at least one feed, corresponding to the at least one feed rotated around the main longitudinal direction.

4. The waveguide feed array according to claim 1, wherein adjacent clusters along a second direction of the two main directions (Y) do not have any feeds in common.

5. The waveguide feed array according to claim 1, wherein an angular orientation around the main longitudinal direction (Z) of consecutive feeds along the first direction of the two main directions-(alternates by 180°, whereas the angular orientation around the main longitudinal direction (Z) of consecutive feeds along the second direction of the two main directions-(is invariant.

6. The waveguide feed array according to claim 1, wherein the clusters are offset with respect to each other, the offset comprising a translation within the plane, a rotation around the main longitudinal direction, and/or a mirror operation with respect to a symmetry plane including the main longitudinal direction.

7. The waveguide feed array according to claim 1, wherein each cluster comprises a number of feeds ranging between 2 and 5.

8. The waveguide feed array according to claim 7, wherein the number of feeds for each cluster is 3 or 4.

9. The waveguide feed array according to claim 1, wherein the plane of its the aperture is defined by the two main directions at an angle of approximately 60° or less.

10. The waveguide feed array according to claim 1, wherein each cluster comprises exactly three feeds and the angular orientation around the main longitudinal direction of each cluster, with reference to an arrangement of radiating elements of the feeds, is invariant along the first direction of the two main directions, along which adjacent clusters share at least one feed, while the angular orientation around the main longitudinal direction of each cluster, with reference to the arrangement of the radiating elements of the feeds, alternates by 180° along the second direction of the two main directions, along which adjacent clusters do not have any feeds in common.

11. The waveguide feed array according to claim 1, wherein each cluster comprises exactly three feeds and the angular orientation around the main longitudinal direction of each cluster, with reference to an arrangement of radiating elements of the feeds, varies between 0 and 180° along the first of the main directions, along which at least two consecutive clusters have the same orientation and share at least one feed, while the angular orientation around the main longitudinal direction of each cluster, with reference to the arrangement of the radiating elements of the feeds, alternates by 180° along the second direction of the two main directions, along which adjacent clusters do not have any feeds in common.

12. The waveguide feed array according to claim 1, wherein each cluster comprises exactly 4-four feeds and the angular orientation around the main longitudinal direction of each cluster, with reference to an arrangement of radiating elements of the feeds, is invariant along the first direction of the two main directions, along which adjacent clusters share at least one feed, and along the second direction of the two main directions, along which adjacent clusters do not have any feeds in common.

13. The waveguide feed array according to claim 1, wherein each cluster comprises exactly four feeds and the angular orientation around the main longitudinal direction of each cluster, with reference to an arrangement of radiating elements of the feeds, alternates between 0 and 120° along the first direction of the two main directions, along which adjacent clusters share at least one feed, while the angular orientation around the main longitudinal direction of the clusters is invariant along the second direction of the two main directions, along which adjacent clusters do not have any feeds in common.

14. The waveguide feed array according to claim 1, wherein;

the ports of the feeds are arranged according to the same pattern for all feeds of the waveguide feed array;

said pattern has a discrete symmetry; and ports corresponding to different polarizations for a given frequency band map to each other under the discrete symmetry.

15. The waveguide feed array according to claim 1, wherein the beamforming networks each comprise a combination of E-plane and H-plane power dividers to introduce a phase difference of 180° between feeds having different angular orientations around the main longitudinal direction and with path lengths substantially equal between a common waveguide port and any other port.

16. The waveguide feed array according to claim 1, wherein the two beamforming networks in the at least two distinct frequency bands for each cluster are interleaved to reduce overall volume.

17. The waveguide feed array according to claim 1, wherein, for each group of clusters having the same number of feeds, all beamforming networks have an identical design and are related to each other by at least one of translation, rotation, and/or symmetry along or around at least one of the directions and such that there is no overlapping between beamforming networks of adjacent feed clusters.

18. An antenna system comprising at least one waveguide feed array according to claim 1 and a reflector antenna producing a coverage of multiple contiguous beams, congruent in the at least two distinct frequency bands, with polarization reuse along a first direction, corresponding to the first direction of the two main directions of the feed array along which adjacent clusters are configured to operate in orthogonal polarization and at least two consecutive clusters share at least one feed, and with frequency reuse along a second direction, corresponding to the second direction of the two main directions of the feed array along which adjacent clusters are configured to operate in the same polarization and have no feeds in common.

19. The antenna system according to claim 18, wherein a geometry of the reflector antenna is an offset paraboloid and the at least one waveguide feed array has its aperture coinciding with a focal plane of the offset paraboloid, the main longitudinal direction pointing approximately towards the center of the reflector antenna, and a spacing between feeds ranging between two and three wavelengths at a higher operating frequency among the at least two distinct frequency bands.

* * * * *